(12) United States Patent
Endo

(10) Patent No.: US 11,778,124 B2
(45) Date of Patent: Oct. 3, 2023

(54) COLOR DATA CONVERSION METHOD, COLOR DATA CONVERSION DEVICE, AND NON-TRANSITORY COMPUTER-READABLE RECORDING MEDIUM RECORDING COLOR DATA CONVERSION PROGRAM

(71) Applicant: SCREEN HOLDINGS CO., LTD., Kyoto (JP)

(72) Inventor: Hiroki Endo, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 18/074,982

(22) Filed: Dec. 5, 2022

(65) Prior Publication Data

US 2023/0188667 A1  Jun. 15, 2023

(30) Foreign Application Priority Data

Dec. 10, 2021  (JP) ................... 2021-200526

(51) Int. Cl.
*H04N 1/54* (2006.01)
*H04N 1/60* (2006.01)
*H04N 1/00* (2006.01)

(52) U.S. Cl.
CPC ......... *H04N 1/54* (2013.01); *H04N 1/00039* (2013.01); *H04N 1/6008* (2013.01); *H04N 1/6033* (2013.01)

(58) Field of Classification Search
CPC .... H04N 1/54; H04N 1/00039; H04N 1/6008; H04N 1/6033
See application file for complete search history.

(56) References Cited

U.S. PATENT DOCUMENTS

2011/0069334 A1\* 3/2011 Hoshii ................. H04N 1/6033
358/1.9
2020/0031136 A1  1/2020 Yokouchi
2020/0314290 A1\* 10/2020 Yokouchi ............. H04N 1/6033

FOREIGN PATENT DOCUMENTS

JP  2020-017902 A  1/2020

\* cited by examiner

*Primary Examiner* — Quang N Vo
(74) *Attorney, Agent, or Firm* — McDermott Will & Emery LLP

(57) ABSTRACT

A computer analyzes submitted data to identify insufficient data among data necessary for executing C×F color conversion process. When spectral characteristic data of a patch constituting a C×F chart is insufficient, a computer supplements the spectral characteristic data. When complete printing order data has not been obtained, the computer supplements printing order data. The color conversion process is performed using the data after supplement.

15 Claims, 18 Drawing Sheets

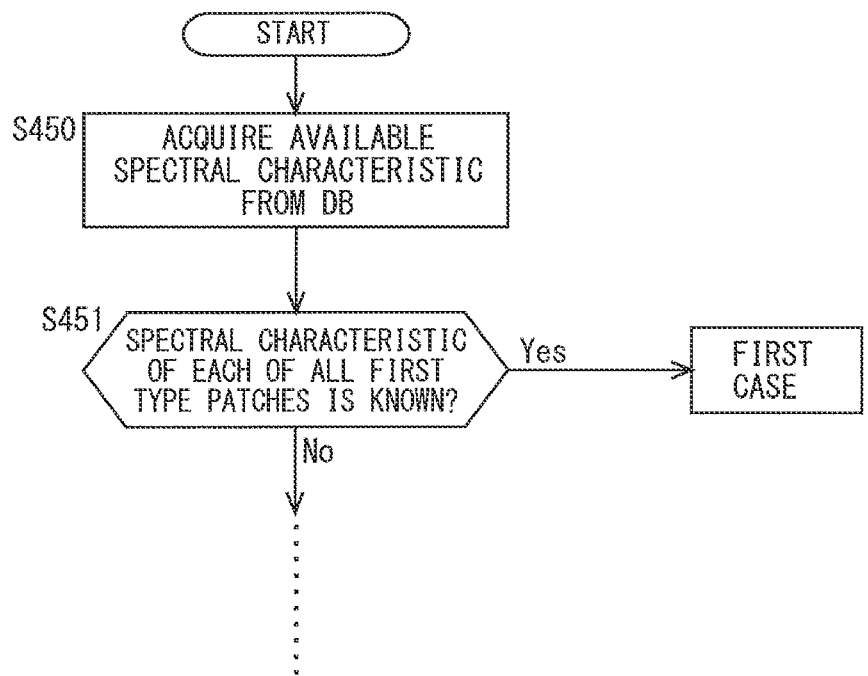
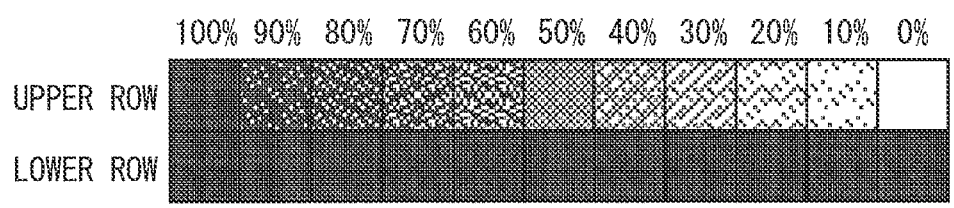

COLOR DATA CONVERSION METHOD, COLOR DATA CONVERSION DEVICE, AND NON-TRANSITORY COMPUTER-READABLE RECORDING MEDIUM RECORDING COLOR DATA CONVERSION PROGRAM

CROSS REFERENCE TO RELATED APPLICATION

This application claims the benefit of Japanese Application No. 2021-200526, filed on Dec. 10, 2021, the entire contents of each are hereby incorporated by reference.

BACKGROUND OF THE INVENTION

Field of the Invention

The present invention relates to a color data conversion method for converting color data related to a spot color included in submitted data into color data for a printing device used for printing.

Description of Related Art

In recent years, digital printing with a digital printing device such as an inkjet printer has been widely performed in the printing industry. However, in the field of labels and packages, analog printing (offset printing, gravure printing, flexographic printing, etc.) with a printing device that uses a printing plate is still often performed in recent years. However, there is an increasing demand for shortening the delivery times for design and content production, and in a case where analog printing is adopted, the problem is the high cost incurred by remanufacturing the printing plate and reversing the process when the design or the like is changed. In this aspect, according to digital printing, the printing plate is not used, so that the work of replacing and remanufacturing the printing plate does not occur. That is, adopting digital printing makes it possible to perform printing of a small lot at low cost and to meet the demand for shortening the delivery times of design and content production at low cost.

Meanwhile, in the field of labels and packaging, there is a trend toward the extensive use of spot colors to enhance color expression. Therefore, in order to perform printing with the digital printing device by using print data generated for analog printing, it is necessary to convert color data related to a spot color in submitted data into color data for the digital printing device so that a color obtained by overprinting inks of a plurality of colors, including a spot color, is reproduced as faithfully as possible by the digital printing device. As a method for such conversion, there is known a conversion process using data in a format called C×F (hereinafter referred to as "C×F data") that is standardized as an ISO standard (hereinafter, the conversion process is referred to as a "C×F color conversion process"). Note that C×F is an abbreviation of "color exchange format".

The C×F data is typically made up of spectral characteristic data (spectral value data such as spectral reflectance) of a plurality of patches constituting a color chart called a "C×F chart" as illustrated in FIG. 22. In the example illustrated in FIG. 22, the C×F chart includes 22 patches. The 11 patches in the upper row are patches obtained by applying the target ink on a base material such as printing paper with the dot percentage in 10% increments. The 11 patches in the lower row are patches obtained by applying a target ink on black (black solid) with the dot percentage in 10% increments. The C×F chart includes a plurality of patches corresponding to a plurality of levels of ink density as seen above. In the C×F color conversion process, a spectral characteristic corresponding to a color obtained by overprinting inks of a plurality of colors, including a spot color, is predicted on the basis of the spectral characteristic data of each of the plurality of patches, and a CMYK value (combination of C, M, Y, and K values provided to the digital printing device used for printing) corresponding to the predicted spectral characteristic is obtained. Since the spectral characteristic corresponding to the color obtained by overprinting the spot color ink with the process color ink is also predicted in the C×F color conversion process, the C×F data can include not only spot color data but also process color data. Also, in the following description, it is assumed that the C×F data is made up of the spectral characteristic data of the 22 patches.

Concerning the C×F color conversion process, Japanese Laid-Open Patent Publication No. 2020-017902 discloses a method for accurately predicting a color (spectral characteristic) obtained by overprinting inks of a plurality of colors including a spot color.

For executing the C×F color conversion process, spectral characteristic data of the 22 patches as C×F data and printing order data representing a printing order of a plurality of colors (ink colors) in a case where analog printing is performed using data to be processed are required. Hereinafter, these pieces of data required for executing the C×F color conversion process are simply referred to as "essential data". In the conventional system, at the time of executing the C×F color conversion process, a user determines whether or not all the essential data is included in the submitted data. Then, when there is missing data (data not included in the submitted data among the essential data), it is necessary for the user to operate the graphical user interface (GUI) to supplement the missing data. Therefore, the automation of the entire process, including the C×F color conversion process, has not been achieved. In addition, sufficient knowledge about analog printing is required for supplementing the printing order data. Therefore, it is difficult for the user of the digital printing device who does not have sufficient knowledge of analog printing to supplement printing order data.

SUMMARY OF THE INVENTION

In view of the above circumstances, an object of the present invention is to automatically determine the presence or absence of essential data and supplement missing data without requiring the operation of the user, regarding a color conversion process using color chart data such as C×F data.

One aspect of the present invention is directed to a color data conversion method for converting, using a computer, color data related to a spot color included in submitted data into color data for a printing device used for printing on a basis of color chart data including spectral characteristic data of each of a plurality of patches corresponding to a plurality of levels of ink density, the color data conversion method including:

a submission step of providing image data to be printed including color data and spectral characteristic data related to a spot color used in the image data to the computer as the submitted data;

an insufficient patch identification step of identifying, by the computer, a patch, spectral characteristic data of which is not obtained for a spot color used in the image data, as an insufficient patch by analyzing the submitted data;

a spectral characteristic supplement step of supplementing, by the computer, spectral characteristic data of the insufficient patch;
a first conversion step of converting, by the computer, color data related to a spot color and included in the image data into spectral characteristic data on a basis of the color chart data including spectral characteristic data supplemented in the spectral characteristic supplement step; and
a second conversion step of converting, by the computer, the spectral characteristic data obtained in the first conversion step into color data for the printing device.

With such a configuration, after the submitted data including the image data to be printed is provided to the computer, the computer analyzes the submitted data to identify a patch, the spectral characteristic data of which is not obtained for a spot color used in the image data, as an insufficient patch. Then, the computer supplements the spectral characteristic data of the insufficient patch. As above, the determination of the presence or absence of the spectral characteristic data, which is the data necessary for the process of converting the color data related to the spot color included in the submitted data into the color data for the printing device, and the supplement of the insufficient spectral characteristic data are automatically performed without requiring the operation of the user. Thus, the printing process of the image data including the spot color by the digital printing device is made efficient.

Another aspect of the present invention is directed to a color data conversion device that converts color data related to a spot color included in submitted data into color data for a printing device used for printing on a basis of color chart data including spectral characteristic data of each of a plurality of patches corresponding to a plurality of levels of ink density, the color data conversion device including:
a processor; and
a memory configured to store a program,
wherein when the program stored in the memory is executed by the processor, the program causes the processor to:
receive image data to be printed including color data and spectral characteristic data related to a spot color used in the image data as the submitted data;
identify a patch, spectral characteristic data of which is not obtained for a spot color used in the image data, as an insufficient patch, by analyzing the submitted data;
supplement spectral characteristic data of the insufficient patch;
convert color data related to a spot color and included in the image data into spectral characteristic data on a basis of the color chart data including supplemented spectral characteristic data; and
convert spectral characteristic data obtained by conversion into color data for the printing device.

Still another aspect of the present invention is directed to a non-transitory computer-readable recording medium recording a color data conversion program for converting color data related to a spot color included in submitted data into color data for a printing device used for printing on a basis of color chart data including spectral characteristic data of each of a plurality of patches corresponding to a plurality of levels of ink density, wherein
the color data conversion program causes a computer to execute
an insufficient patch identification step of identifying a patch, spectral characteristic data of which is not obtained for a spot color used in image data to be printed including color data, as an insufficient patch by analyzing the submitted data including the image data and spectral characteristic data related to a spot color used in the image data,
a spectral characteristic supplement step of supplementing spectral characteristic data of the insufficient patch,
a first conversion step of converting color data related to a spot color and included in the image data into spectral characteristic data on a basis of the color chart data including spectral characteristic data supplemented in the spectral characteristic supplement step, and
a second conversion step of converting spectral characteristic data obtained in the first conversion step into color data for the printing device.

These and other objects, features, modes, and advantageous effects of the present invention will become more apparent from the following detailed description of the present invention with reference to the accompanying drawings.

BRIEF DESCRIPTION OF THE DRAWINGS

FIG. 21 is a diagram (part of a flowchart) for explaining a second modification of the embodiment.

FIG. 22 is a diagram for explaining the C×F chart.

DETAILED DESCRIPTION OF PREFERRED EMBODIMENT

0. Introduction

Figure 1:
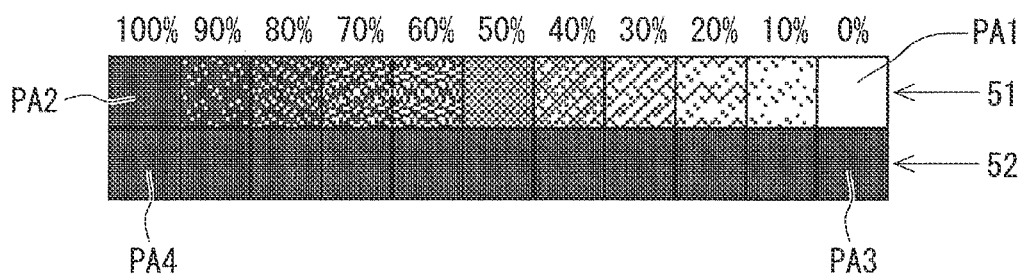
FIG. 1 is a diagram for explaining terms used in the present specification concerning a C×F chart.

Before an embodiment is described, terms used in the present specification and basic matters related to the present invention will be described with reference to FIG. 1. Concerning the C×F chart illustrated in FIG. 1, a patch in the upper row (each of patches in a row denoted by reference numeral 51) (each of patches obtained by applying a target ink on a base material such as printing paper in increments of 10% dot percentage) is referred to as a "first type patch", and a patch in the lower row (each of patches in a row denoted by reference numeral 52) (each of patches obtained by applying the target ink on black in increments of 10% dot percentage) is referred to as a "second type patch". A patch representing the color of the base material itself (a patch denoted by reference numeral PA1 in FIG. 1) is referred to as a "paper white patch", a patch in a state where the target ink is applied solidly (having the maximum ink density) on the base material (a patch denoted by reference numeral PA2 in FIG. 1) is referred to as a "solid patch", a patch in a state where only the black ink is applied solidly on the base material (a patch denoted by reference numeral PA3 in FIG. 1) is referred to as a "black solid patch", and a patch in a state where the target ink is applied solidly on the black ink on the base material (a patch denoted by reference numeral PA4 in FIG. 1) is referred to as a "double solid patch". Each patch of the first type patches 51 excluding the paper white patch PA1 and the solid patch PA2 is referred to as a "first type halftone patch", and each patch of the second type patches 52 excluding the black solid patch PA3 and the double solid patch PA4 is referred to as a "second type halftone patch".

In the following embodiment, spectral reflectance data is used as spectral value data constituting the spectral characteristic data. In this regard, a case where the spectral reflectance is obtained in increments of 10 nm in the wavelength range of 380 nm to 730 nm (i.e., a case where one color is identified by 36 spectral reflectances) will be assumed. However, the present invention is not limited thereto, and for example, the following embodiment can also be applied to a case where spectral reflectances of the number obtained by dividing a wavelength range including a range of 400 nm to 700 nm by a unit wavelength range of an appropriate size are be obtained.

An embodiment of the present invention will be described with reference to the accompanying drawings.

1. Overall Configuration of Printing System

Figure 2:
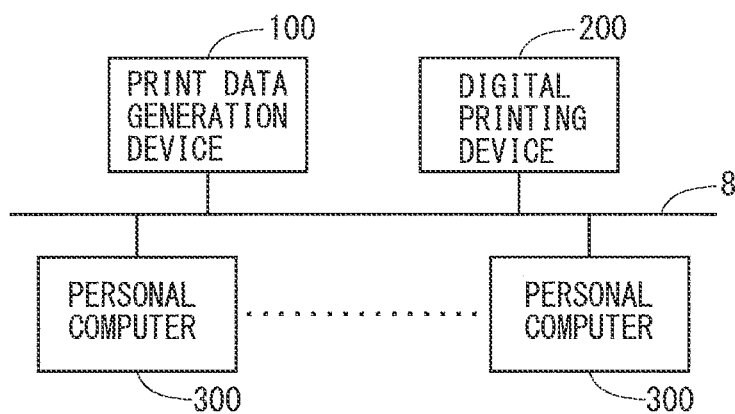
FIG. 2 is an overall configuration diagram of a printing system according to an embodiment of the present invention.

FIG. 2 is an overall configuration diagram of a printing system according to an embodiment of the present invention. The printing system includes a print data generation device 100, a digital printing device 200 such as an inkjet printer, and a plurality of personal computers 300. These components are communicably connected to each other by a communication line 8. Note that a color data conversion device is achieved by the print data generation device 100.

The print data generation device 100 performs various processes on submitted data such as a PDF file to generate print data. Hereinafter, a series of processes including a raster image processor (RIP) process and a color conversion process executed by the print data generation device 100 is referred to as a "print data generation process". The color conversion process includes the C×F color conversion process described above and an ICC color conversion process using an ICC profile. The digital printing device 200 performs printing on the basis of the print data generated by the print data generation device 100. The personal computer 300 exchanges data with the outside of the printing system via the communication line 8, for example.

Note that the printing system may include a color measuring machine that measures colors, a plate-making device that makes a printing plate on the basis of data generated by the print data generation device 100, an analog printing device that performs analog printing using the printing plate made by the plate-making device, and the like.

2. Configuration of Print Data Generation Device

2.1 Hardware Configuration

Figure 3:
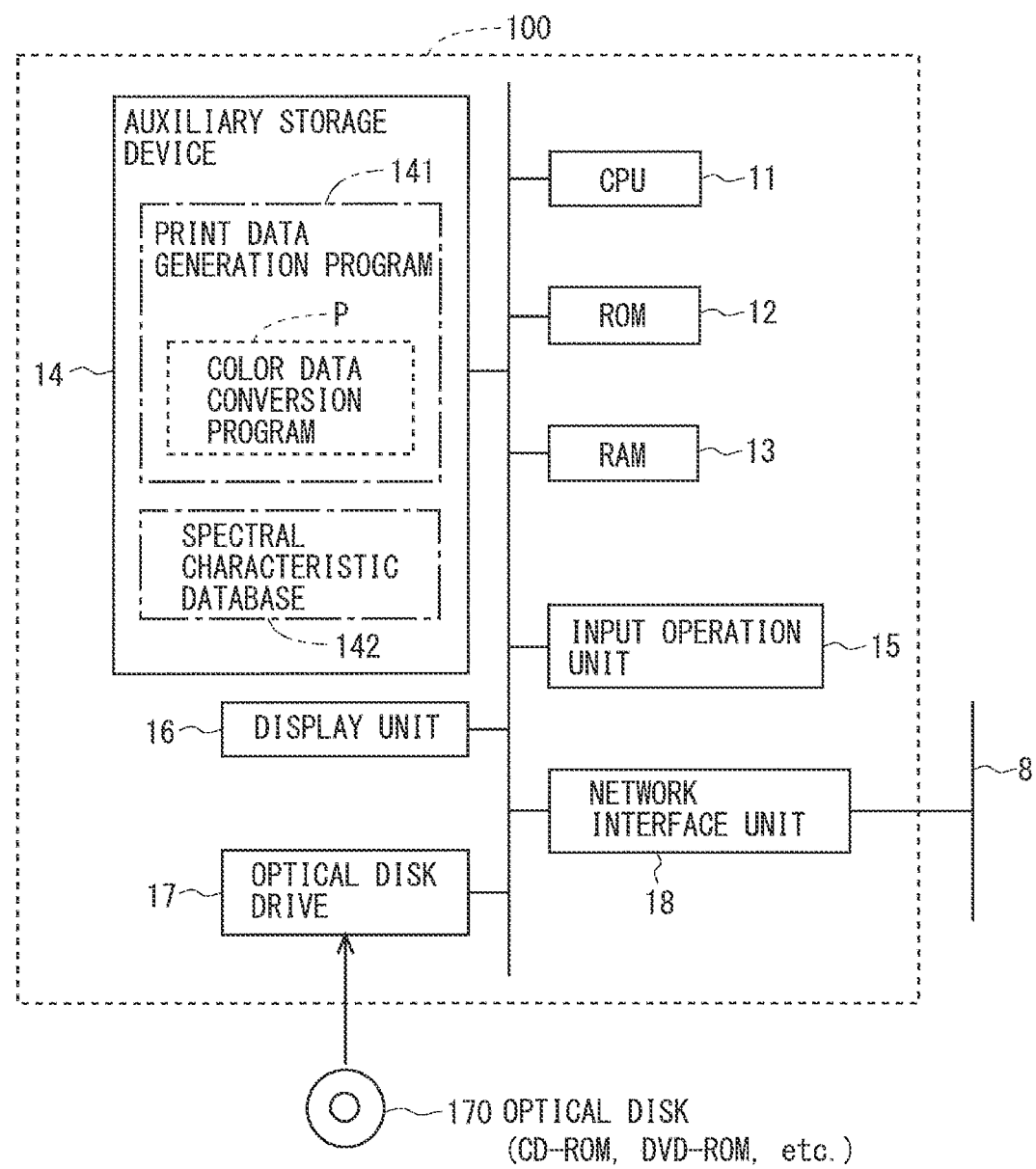
FIG. 3 is a hardware configuration diagram of a print data generation device according to the embodiment.

FIG. 3 is a hardware configuration diagram of the print data generation device 100 according to the present embodiment. The print data generation device 100 is achieved by a computer such as a personal computer and includes a central processing unit (CPU) (processor) 11, a read-only memory (ROM) 12, a random-access memory (RAM) 13, an auxiliary storage device 14, an input operation unit 15 such as a keyboard, a display unit 16, an optical disk drive 17, and a network interface unit 18. Submitted data transmitted via the communication line 8 is inputted into the print data generation device 100 through the network interface unit 18. The print data generated on the basis of the submitted data by the print data generation device 100 is transmitted to the digital printing device 200 via the communication line 8 through the network interface unit 18.

The auxiliary storage device 14 is provided with a spectral characteristic database 142 that holds C×F data for various colors (ink colors). A print data generation program 141 for executing the print data generation process is stored in the auxiliary storage device 14. Note that the print data generation program 141 includes a color data conversion program P for executing the color conversion process. The print data generation program 141 is provided by being stored in a computer-readable recording medium (non-transitory recording medium) such as a compact disc (CD)-ROM or a digital video disc (DVD)-ROM. That is, for example, the user purchases an optical disk (CD-ROM, DVD-ROM, etc.) 170 as a recording medium of the print data generation program 141, attaches the optical disk to the optical disk drive 17, reads the print data generation program 141 from the optical disk 170, and installs the print data generation program in the auxiliary storage device 14. Alternatively, the print data generation program 141 transmitted via the communication line 8 may be received by the network interface unit 18 and installed in the auxiliary storage device 14.

In the present embodiment, the spectral characteristic database 142 is provided in the auxiliary storage device 14 in the print data generation device 100, but the present invention is not limited thereto. The spectral characteristic database 142 may be provided in another device in the printing system or may be provided in an external device connected via the communication line 8.

2.2 Schematic Functional Configuration

Figure 4:
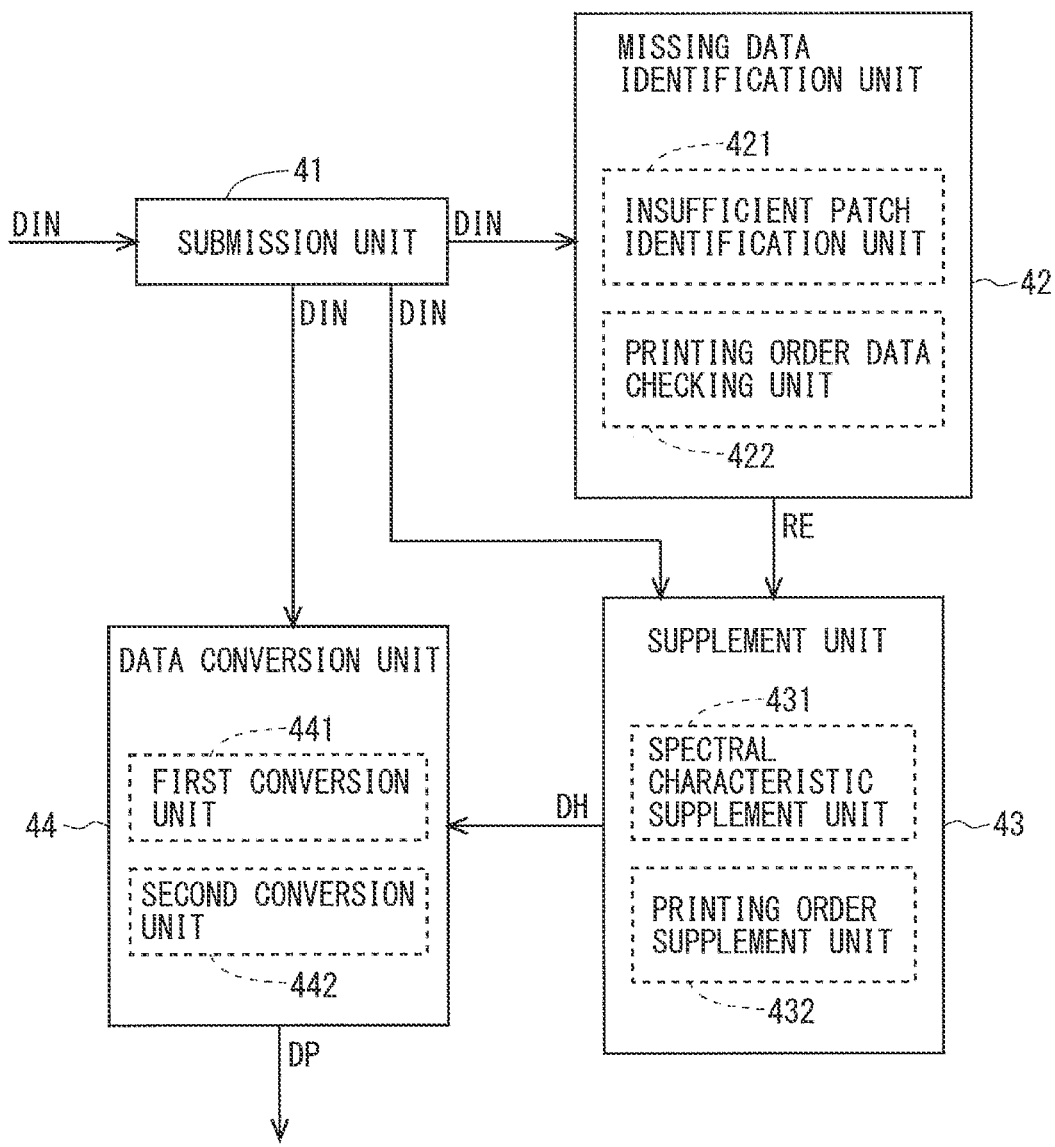
FIG. 4 is a block diagram illustrating a functional configuration of a portion functioning as a color data conversion device in the functional configuration of the print data generation device in the embodiment.

FIG. 4 is a block diagram illustrating a functional configuration of a portion functioning as the color data conversion device in the functional configuration of the print data generation device 100. As illustrated in FIG. 4, the print data generation device 100 (a portion functioning as a color data conversion device) includes, as functional components, a submission unit 41, a missing data identification unit 42, a supplement unit 43, and a data conversion unit 44. The missing data identification unit 42 includes an insufficient patch identification unit 421 and a printing order data checking unit 422. The supplement unit 43 includes a spectral characteristic supplement unit 431 and a printing order supplement unit 432. The data conversion unit 44 includes a first conversion unit 441 and a second conversion unit 442.

In the present embodiment, the submission unit 41 receives a PDF file (PDF data) as submitted data DIN. The submitted data DIN may include, in addition to image data to be printed including color data, CxF data (color chart data) related to a color used in the image data, and printing order data representing a printing order of a plurality of colors (ink colors) when analog printing based on the image data is assumed to be performed.

The insufficient patch identification unit 421 analyzes the submitted data DIN to identify a patch, the spectral characteristic data of which is not obtained for a spot color used in the image data (a patch, the spectral characteristic data of which is not included in the submitted data DIN), as an insufficient patch. The printing order data checking unit 422 analyzes the submitted data DIN to check whether or not the printing order data is included in the submitted data DIN. A result RE of the analysis of the submitted data DIN by the insufficient patch identification unit 421 and the printing order data checking unit 422 is provided to the supplement unit 43.

The spectral characteristic supplement unit 431 supplements the spectral characteristic data of the insufficient patch identified by the insufficient patch identification unit 421. The printing order supplement unit 432 supplements the printing order data when the printing order data checking unit 422 determines that the printing order data is not included in the submitted data DIN. Here, the spectral characteristic data supplemented by the spectral characteristic supplement unit 431 and the printing order data supplemented by the printing order supplement unit 432 are collectively referred to as "supplementary data".

The first conversion unit 441 converts the color data included in the image data constituting the submitted data DIN into spectral characteristic data on the basis of the CxF data and the printing order data, which include the supplementary data DH. The conversion is performed for each combination of color values for a plurality of colors including at least one spot color. The second conversion unit 442 converts the spectral characteristic data obtained by the process of the first conversion unit 441 into color data (CMYK value data) DP for the digital printing device 200.

3. Print Data Generation Process

Figure 5:
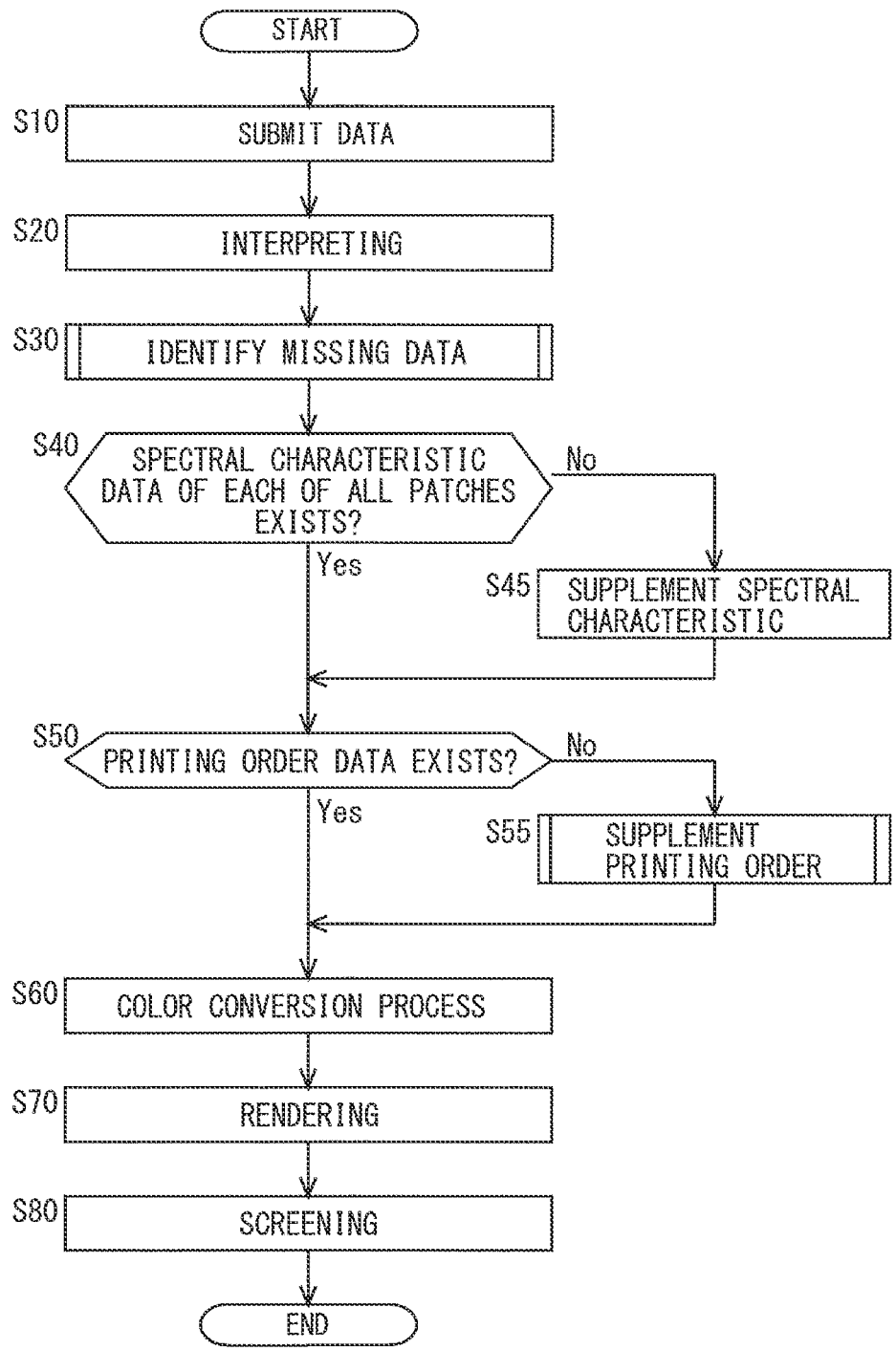
FIG. 5 is a flowchart illustrating a procedure for a print data generation process in the embodiment.

A procedure for a print data generation process executed by the print data generation device 100 will be described with reference to FIG. 5. After the start of the print data generation process, first, a PDF file including image data to be printed is provided to the print data generation device 100 as submitted data DIN (step S10).

Next, a process called "interpreting" for analyzing a PDF file to generate print data for the digital printing device 200 is performed (step S20). For example, a position of an object (character, line drawing, image, etc.) is identified. Note that the process of step S20 is a conventional process.

Figure 6:
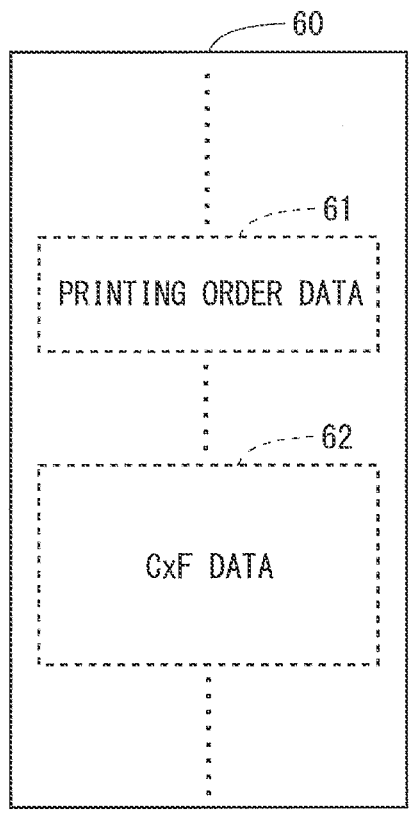
FIG. 6 is a diagram schematically illustrating an internal configuration of a PDF file as submitted data in the embodiment.
Figure 7:
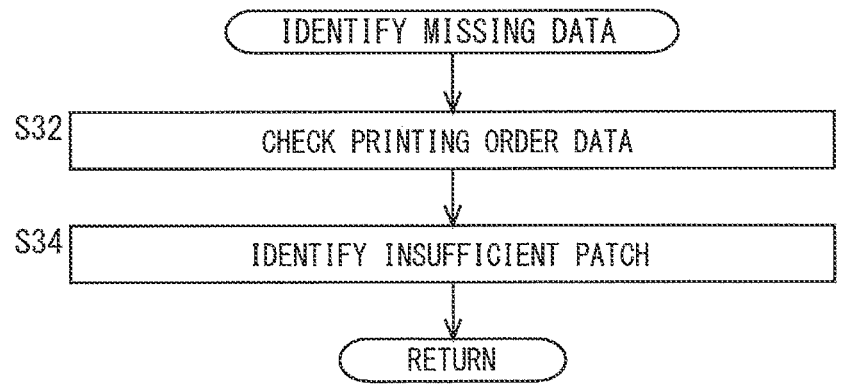
FIG. 7 is a flowchart for explaining details of a step of identifying missing data in the embodiment.

Next, the missing data is identified by further analyzing the PDF file (step S30). Note that the "missing data" here is data that is not included in the PDF file to be analyzed among the essential data described above. In the present embodiment, it is assumed that the spectral characteristic data of the 22 patches constituting the CxF chart (cf. FIG. 1) and the printing order data described above are essential data, and the PDF file 60 includes printing order data 61 and CxF data 62 as schematically illustrated in FIG. 6. Therefore, as illustrated in FIG. 7, this step S30 includes step S32 of inspecting whether or not the printing order data 61 is included in the PDF file 60 and step S34 of identifying a patch, the spectral characteristic data of which is not included in the PDF file 60 for a spot color used in the image data, as an insufficient patch. Note that the CxF data 62 is described in XML, which is one of the markup languages.

Meanwhile, in order to perform the CxF color conversion process with high accuracy in step S60 to be described later, printing order data that enables grasping of the printing order of a plurality of colors for all portions having color overlap in the image data is required. Here, for convenience, such printing order data is referred to as "complete printing order data". In the present embodiment, it is assumed that complete printing order data is prepared (the submitted data DIN including the complete printing order data is provided to the print data generation device 100, or the complete printing order data is generated by the printing order supplement unit 432 supplementing the printing order data) before the CxF color conversion process is performed. However, when high color prediction accuracy is not required for the CxF color conversion process (when a decrease in color prediction accuracy is allowed), it is not necessary to prepare complete printing order data, and the CxF color conversion process may be performed using printing order data created as needed.

After the completion of step S30, it is determined whether or not the spectral characteristic data of each of all the 22 patches constituting the CxF chart is included in the PDF file 60 (step S40). As a result of the determination, when the spectral characteristic data of the 22 patches is all included in the PDF file 60, the process proceeds to step S50, and otherwise, the process proceeds to step S45. In step S45, a process of supplementing the spectral characteristic data of the insufficient patch is performed. Note that a detailed procedure for step S45 will be described later.

In step 350, it is determined whether or not the complete printing order data is included in the PDF file 60. As a result of the determination, when the complete printing order data is included in the PDF file 60, the process proceeds to step S60, and otherwise, the process proceeds to step 355. In step 355, a process of supplementing the printing order data is performed. Note that a detailed procedure for step S55 will be described later.

In step S60, a color conversion process is performed. In step S60, color value data based on the PDF data as the submitted data DIN is converted into color value data (CMYK value data) for the digital printing device 200 for each combination of color values for a plurality of colors constituting the image data included in the PDF file 60. As described above, the color conversion process includes the C×F color conversion process and the ICC color conversion process. The C×F color conversion process is performed in a state in which the missing data is supplemented with the supplementary data DH.

Next, a process called "rendering" is performed on the image data included in the PDF file 60, using the result of the color conversion process in step S60 (step S70). Thereby, multi-valued bitmap data is generated.

Finally, a process called "screening" is performed on the multi-valued bitmap data generated in step S70 (step S80). Thereby, binary bitmap data is generated as halftone dot data. More specifically, for example, a 1-bit TIFF file is generated for each color of CMYK.

When the binary bitmap data is generated for each color in step S80, the print data generation process is completed.

As described above, in the present embodiment, the print data generation device 100 performs the process of converting color data related to a spot color included in submitted data into color data for the printing device (digital printing device 200) used for printing, using the computer.

In the present embodiment, the submission step is achieved by step S10, the printing order data checking step is achieved by step S32, the insufficient patch identification step is achieved by step S34, the spectral characteristic supplement step is achieved by step S45, and the printing order supplement step is achieved by step S55.

4. Supplement of Printing Order Data

The process of step S55 in FIG. 5 (the process of supplementing the printing order data) will be described in detail with reference to the flowchart illustrated in FIG. 8. However, the procedure shown here is an example, and the present invention is not limited thereto. Note that a plurality of colors (ink colors) used in the image data included in the submitted data DIN (PDF file 60) are referred to here as "used colors". The used colors include not only spot colors but also process colors. Data obtained by arranging the data of the used colors according to the printing order is the printing order data.

First, assuming that the maximum lightness is 100 and the minimum lightness is 0, the used colors are classified into ten lightness levels on the basis of the lightness (step S551). The lightness corresponds to the magnitude of the L value in the CIELAB color space. For example, a used color with a lightness of 3 is classified as "lightness level 1", a used color with a lightness of 63 is classified as "lightness level 7", and a used color with a lightness of 95 is classified as "lightness level 10". Then, the used colors (used color data) are sorted so that the higher the lightness level, the earlier the printing order.

Figure 8:
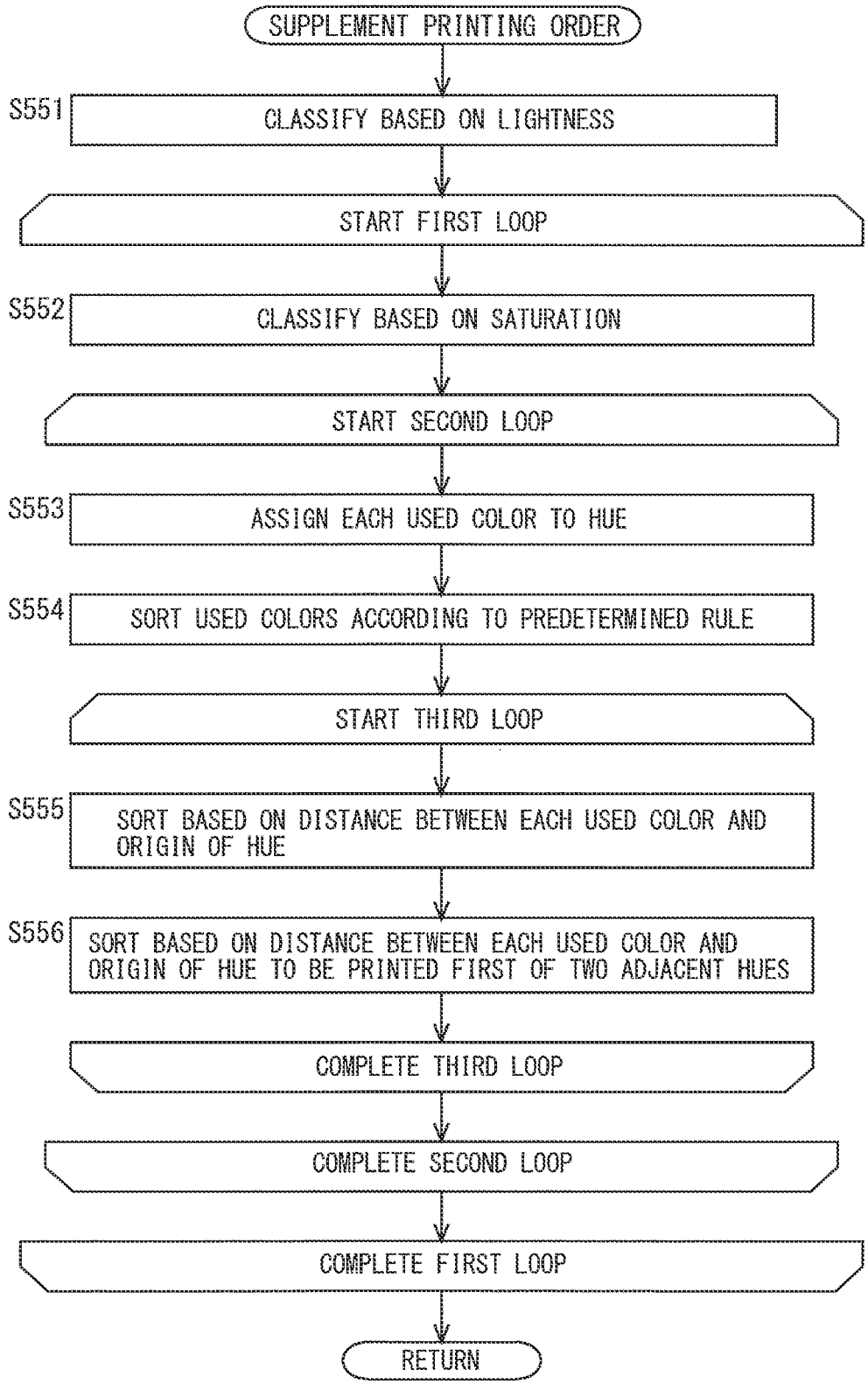
FIG. 8 is a flowchart illustrating a detailed procedure for a process of supplementing the printing order data in the embodiment.

After the completion of step S551, a process of a first loop is performed as illustrated in FIG. 8 for each lightness level. However, it is sufficient that the process of the first loop be performed only for the lightness level to which two or more used colors were assigned by the classification in step S551. In other words, when two or more used colors are classified into the same lightness level in step S551, the process of the first loop is performed on the lightness level.

In step S552, assuming that the maximum saturation is 100 and the minimum saturation is 0, the used colors are classified into ten saturation levels on the basis of the saturation. The saturation corresponds to a distance (Δab) from the coordinates of "(a, b)=(0,0)" (coordinates corresponding to achromatic color) in the CIELAB color space. For example, a used color with a saturation of 8 is classified as "saturation level 1", a used color with a saturation of 35 is classified as "saturation level 4", and a used color with a saturation of 92 is classified as "saturation level 10". Then, the used colors are sorted so that the higher the saturation level, the earlier the printing order.

After the completion of step S552, a process of a second loop is performed as illustrated in FIG. 8 for each saturation level. However, it is sufficient that the process of the second loop be performed only for the saturation level to which two or more used colors were assigned by the classification in step S552. In other words, when two or more used colors are classified into the same saturation level in step S552, the process of the second loop is performed on the saturation level.

In step S553, each used color is assigned to one of five hues (Y hue, O hue, M hue, G hue, and C hue). In step S553, a distance (Δab) from the origin of each of the five hues is obtained in the CIELAB color space for the used color, and the used color is assigned to the hue for which the minimum distance (Δab) is obtained. Note that the coordinates of the origin of the Y hue are "(a, b)=(100, 0)", the coordinates of the origin of the O hue are "(a, b)=(75, 75)", the coordinates of the origin of the M hue are "(a, b)=(0,100)", the coordinates of the origin of the G hue are "(a, b)=(0, −100)", and the coordinates of the origin of the C hue are "(a, b)=(−100, 0)".

In step S554, the used colors are sorted according to a predetermined rule on the basis of the result of the process in step S553. For example, when flexographic printing is assumed, the used colors are sorted so that the printing order is "Y, O, M, G, C".

After the completion of step S554, a process of a third loop is performed as illustrated in FIG. 8 for each hue. However, it is sufficient that the process of the third loop be performed only for the hue to which two or more used colors were assigned by the process in step S553.

In step S555, the used colors are sorted on the basis of the distance between each used color and the origin of the hue. Specifically, the used colors are sorted so that the smaller the distance (Δab) obtained in step S553, the earlier the printing order.

Furthermore, when there are two or more used colors for which the printing order cannot be determined by the process of step S555, the used colors are sorted on the basis of the distance between each used color and the origin of the hue to be printed first of the two adjacent hues (step S556). For example, when flexographic printing is assumed, and the printing order of the two used colors assigned to the O hue has not been determined, the distance from the origin of the Y hue is obtained for each used color because the two hues adjacent to the O hue are the Y hue and the M hue, and the printing order is "Y, O, M, G, C" as described above. Then, the used colors are sorted so that the shorter the distance, the earlier the printing order.

The data representing the order of the used colors at the time when all the processes of the first to third loops are completed in the above manner is used for the C×F color conversion process as the printing order data.

Focusing on the process of step S551 and the process of step S552, the printing order data is supplemented so that the used color (ink color) classified into the lightness level corresponding to the higher lightness comes first in the printing order than the used color classified into the lightness level corresponding to the lower lightness, and that for two or more used colors classified into the same lightness level, the used color classified into the saturation level corresponding to the higher saturation comes first in the printing order than the used color classified into the saturation level corresponding to the lower saturation. Further, when the two or more used colors are classified into the same saturation level in step S552, the printing order data is supplemented so that the printing order of the two or more used colors is the order following a predetermined rule on the basis of the hue.

In the present embodiment, a lightness classification step is achieved by step S551, and a saturation classification step is achieved by step S552.

5. Method for Obtaining Spectral Characteristic Data

Before describing the detailed procedure for step S45 in FIG. 5, a plurality of specific methods related to a process of obtaining spectral characteristic data of an insufficient patch (a spectral characteristic calculation process) will be described. Note that a procedure for determining a method to be actually adopted from the plurality of specific methods will be described later. In addition, spectral characteristic data of an insufficient patch may be obtained using a method except for the plurality of specific methods described here. That is, the present invention is not particularly limited as to how to specifically obtain spectral characteristic data of an insufficient patch. Hereinafter, a spot color to be processed for obtaining spectral characteristic data (a spot color for which an insufficient patch has been identified) is referred to as a "prediction target color", and a patch (an insufficient patch) to be processed for obtaining spectral characteristic data is referred to as a "prediction target patch".

5.1 First Spectral Characteristic Calculation Method

First, a method using "the relationship between the spectral reflectance of the solid patch PA2 and the spectral reflectance of the prediction target patch" for a color similar to the prediction target color will be described as a first spectral characteristic calculation method. Here, a case where the prediction target patch is the first type halftone patch will be described as an example. However, even when the prediction target patch is the second type halftone patch, this first spectral characteristic calculation method can be applied.

Figure 9:
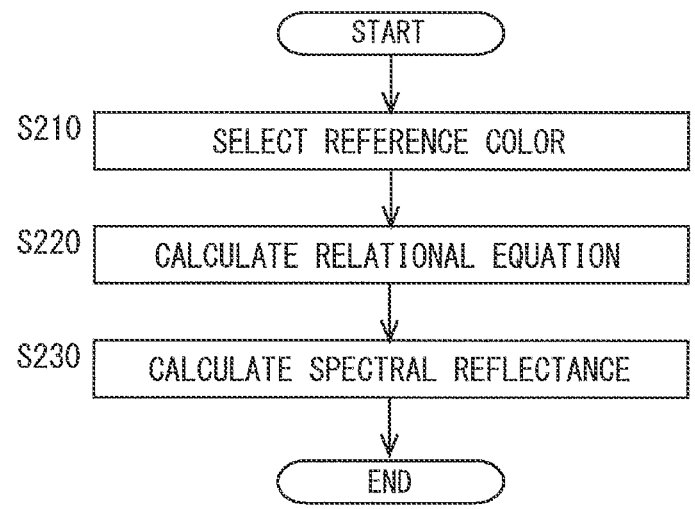
FIG. 9 is a flowchart illustrating a procedure for a spectral characteristic calculation process by a first spectral characteristic calculation method in the embodiment.

FIG. 9 is a flowchart illustrating a procedure for a spectral characteristic calculation process by the first spectral characteristic calculation method. Note that the spectral characteristic data of each of all the first type patches 51 needs to be stored in the spectral characteristic database 142 for an appropriate number of colors (hereinafter referred to as "sample colors") before the spectral characteristic calculation process is executed. Each sample color may be a spot color or a process color. Further, the submitted data needs to include the spectral characteristic data of the solid patch PA2 for the prediction target color. The flow illustrated in FIG. 9 will be described below.

First, a color close to the prediction target color is selected as a reference color from among the plurality of sample colors on the basis of the spectral characteristic data (step S210). For example, when 32 sample colors are prepared, one color close to the prediction target color is selected as the reference color from among the 32 sample colors.

Next, for the reference color (the sample color selected in step S210), a relational equation representing the relationship between the spectral reflectance of the solid patch PA2 as the reference patch and the spectral reflectance of the prediction target patch is obtained (step S220). This relational equation is obtained for each prediction target patch. When the number of prediction target patches is nine, nine relational equations are obtained by the process of step S220.

Finally, by applying the spectral characteristic data (36 pieces of spectral reflectance data) of the solid patch PA2 for the prediction target color to the relational equation obtained in step S220, the spectral characteristic data (36 pieces of spectral reflectance data) of the prediction target patch for the prediction target color is obtained (step S230). When the number of prediction target patches is nine, the spectral characteristic data of the solid patch PA2 for the prediction target color is applied to each of nine relational equations. Thereby, spectral characteristic data of each of the nine prediction target patches is obtained for the prediction target color.

Note that a reference color selection step is achieved by step S210, a relational equation calculation step is achieved by step S220, and a spectral characteristic calculation step is achieved by step S230.

5.1.1 Selection of Reference Color

An example of the process of selecting a reference color (the process of step S210 in FIG. 9) will be described. In the present embodiment, the spectral characteristic data of each patch constituting the C×F chart includes 36 pieces of spectral reflectance data in increments of 10 nm in the wavelength range of 380 nm to 730 nm. Thus, for the prediction target color and the sample color, the spectral characteristic data of the solid patch PA2 includes 36 pieces of spectral reflectance data in increments of 10 nm in the wavelength range of 380 nm to 730 nm. Therefore, a square error for the spectral reflectance of the solid patch PA2 between the prediction target color and each sample color is obtained on the basis of the 36 pieces of spectral reflectance data of the prediction target color and each sample color. Then, the sample color for which the minimum square error is obtained is selected as the reference color.

5.1.2 Calculation of Relational Equation

Figure 10:
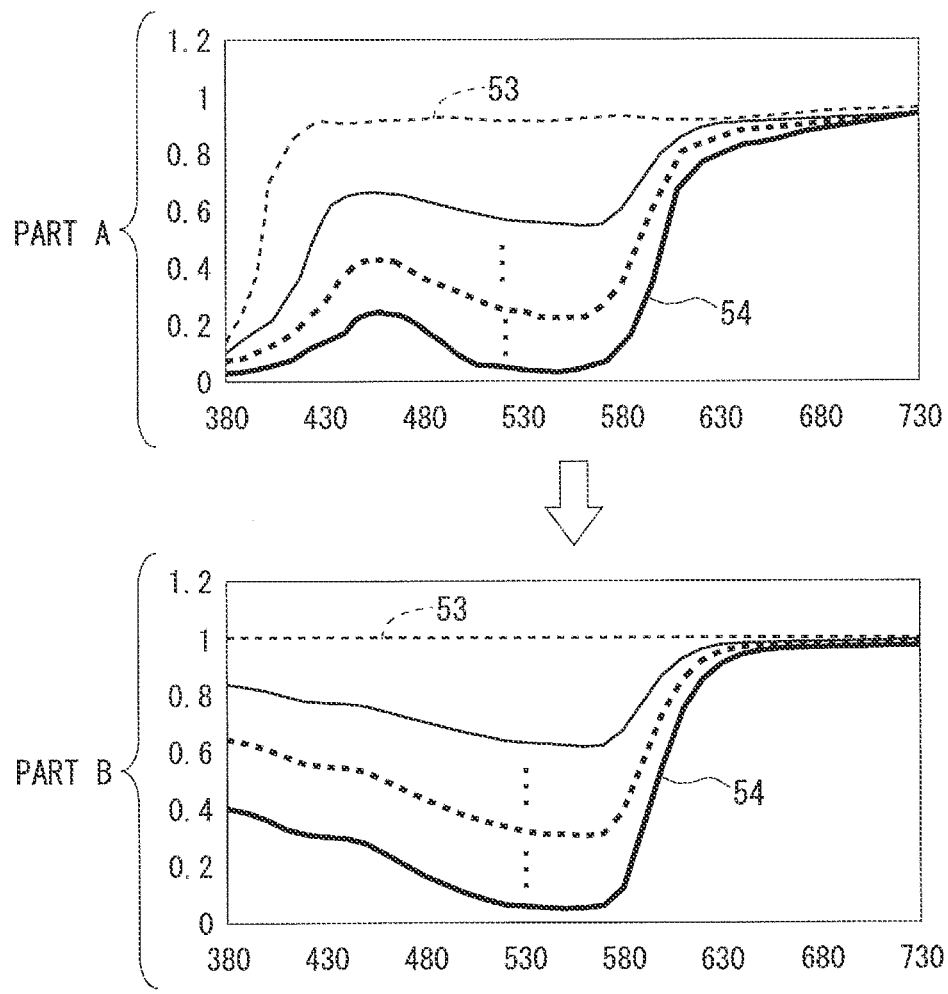
FIG. 10 is a diagram for explaining normalization in calculating a relational equation in the embodiment.

Next, the process for obtaining the relational equation (the process in step S220 in FIG. 9) will be described in detail. Regarding the reference color, the spectral characteristic data of all the first type patches 51 including the paper white patch PA1 and the solid patch PA2 are obtained. That is, data corresponding to a curve (curve representing spectral reflectances) as schematically shown in part A in FIG. 10 is obtained for all the first type patches 51 (regarding FIG. 10, the horizontal axis represents wavelength (unit: nm), and the vertical axis represents spectral reflectance). Note that part A in FIG. 10 shows only curves corresponding to four patches in the first type patches 71 (the same applies to part B in FIG. 10). The curve denoted by reference numeral 53 is a curve for the paper white patch PA1, and the curve denoted by reference numeral 54 is a curve for the solid patch PA2. Such data is normalized so that the spectral reflectances of the paper white patch PA1 are 1. As a result, data corresponding to curves (curves representing spectral reflectances) as schematically shown in part B in FIG. 10 is obtained (note that a straight line is obtained for the paper white patch PA1 that is the reference for normalization).

Figure 11:
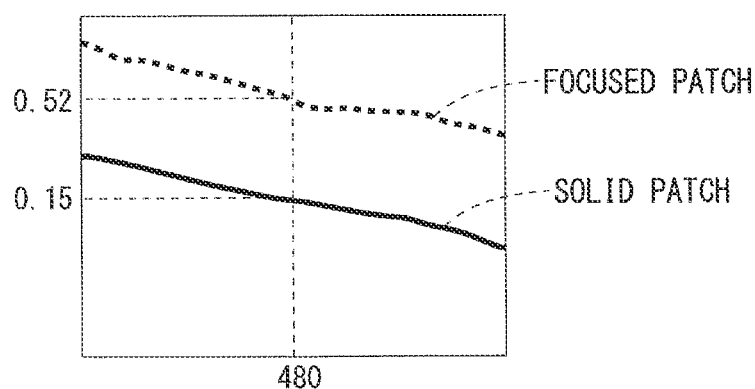
FIG. 11 is a diagram for explaining combination data in the embodiment.
Figure 12:
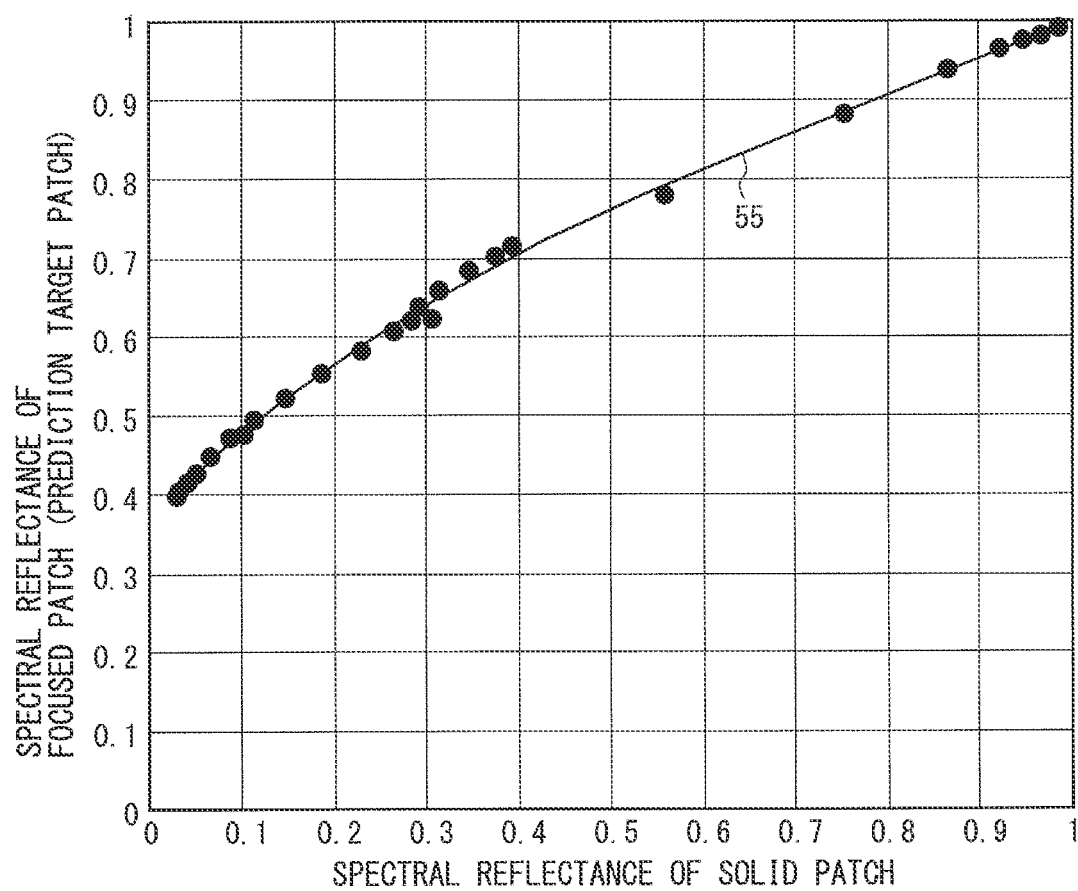
FIG. 12 is a diagram for explaining calculation of a relational equation in the embodiment.
Figure 13:
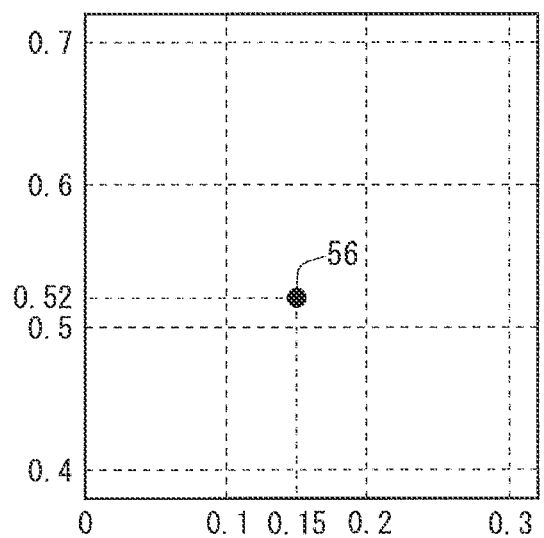
FIG. 13 is a diagram illustrating an example of one plot in the embodiment.

Here, one patch (hereinafter referred to as a "focused patch") as a prediction target patch is focused. Regarding the graph shown in part B in FIG. 10, it is assumed that the curves for the solid patch PA2 and the focused patch around the wavelength of 480 nm are as shown in FIG. 11. In the present embodiment, the spectral reflectance of the solid patch PA2 is 0.15, and the spectral reflectance of the focused patch is 0.52. Here, such data obtained by combining the spectral reflectance of the solid patch PA2 and the spectral reflectance of the focused patch is treated as "combination data". Since the spectral characteristic data is composed of 36 pieces of spectral reflectance data as described above, 36 pieces of combination data of the spectral reflectance (the spectral reflectance after normalization) of the solid patch PA2 and the spectral reflectance (the spectral reflectance after normalization) of the focused patch are obtained. As shown in FIG. 12, each combination data is represented as one plot on a graph (hereinafter referred to as "relational graph" for convenience) in which the horizontal axis represents the spectral reflectance of the solid patch PA2 and the vertical axis represents the spectral reflectance of the focused patch. For example, the combination data based on the data shown in FIG. 11 is represented as a plot denoted by reference numeral 56 in FIG. 13 on the relational graph. In this manner, 36 plots are shown on the relational graph in the present embodiment. The calculation of the relational equation corresponds to obtaining a curve (for example, a curve denoted by reference numeral 55 in FIG. 12) passing through positions as close to the positions of these 36 plots as possible.

In the example shown in part B in FIG. 10, the spectral reflectance assumes a minimum value around the wavelength of 560 nm, and the spectral reflectance assumes the same value at a wavelength larger than 560 nm and a wavelength smaller than 560 nm. Therefore, when the spectral reflectances are sequentially plotted on the relational graph in descending order according to wavelength, for example, the locus is returned. However, as can be understood from FIG. 12, the relationship between the spectral reflectance of the solid patch PA2 and the spectral reflectance of the focused patch (the prediction target patch) is unchanged before and after the locus is returned. From the above, it is considered that the spectral characteristic data (36 pieces of spectral reflectance data) of the prediction target patch for the prediction target color can be accurately obtained from the spectral characteristic data (36 pieces of spectral reflectance data) of the solid patch PA2 for the prediction target color, using the "relationship between the spectral reflectance of the solid patch PA2 and the spectral reflectance of the prediction target patch" for the reference color.

In view of the above, in step S220 in FIG. 9, a relational equation (approximate equation for obtaining an approximate value of the spectral reflectances of the focused patch from the spectral reflectances of the solid patch PA2) representing the relationship between the spectral reflectances of the solid patch PA2 and the spectral reflectances of the focused patch is obtained based on the 36 pieces of combination data described above. The relational equation is obtained by a known method. For example, the relational equation can be obtained by solving simultaneous equations obtained from the 36 pieces of combination data by Gaussian elimination or Gauss-Jordan elimination. In this way, the relational equation corresponding to each prediction target patch is obtained.

Meanwhile, as the relational equation, for example, a quintic equation is adopted. As an example, a quintic equation such as the following Equation (1) is adopted as the relational equation. In the following Equation (1), y represents the spectral reflectance of the prediction target patch, and x represents the spectral reflectance of the solid patch PA2.

$$y=-0.321x^5+0.7136x^4-0.1681x^3-0.6897x^2+1.0892x+0.375 \quad (1)$$

5.1.3 Calculation of Spectral Reflectance

Next, the process for obtaining the spectral reflectance (the process of step S230 of FIG. 9) will be described in detail. At the start of the process in step S230, a quintic equation such as the above Equation (1) is obtained as a relational equation for each prediction target patch. Further, as described above, the spectral characteristic data is composed of 36 pieces of spectral reflectance data. Therefore, in step S230, the 36 pieces of spectral reflectance data as the spectral characteristic data of the solid patch PA2 for the prediction target color are substituted one by one into the corresponding relational equation (relational equation representing the relationship between the spectral reflectance of the solid patch PA2 and the spectral reflectance of the corresponding prediction target patch) for each of the prediction target patches, whereby 36 pieces of spectral reflectance data constituting the spectral characteristic data of the corresponding prediction target patch for the prediction target color are obtained.

Note that, in the present embodiment, as described above, when the relational equation is calculated, normalization is performed so that the spectral reflectance of the white paper patch PA1 are 1. Therefore, the 36 pieces of spectral reflectance obtained from the relational equation are subjected to denormalization (process for returning the normalized data to the data that has not been normalized) based on the actual spectral reflectance of the white paper patch PA1.

5.2 Second Spectral Characteristic Calculation Method

Next, as a second spectral characteristic calculation method, a description will be given of a method for obtaining the spectral characteristic data of the prediction target patch by the relational equation similarly to the first spectral characteristic calculation method, using spectral characteristic data of a first type halftone patch, when the spectral characteristic data of at least one first type halftone patch in addition to the paper white patch PA1 and the solid patch PA2 has been obtained for the prediction target color. Again, a case where the prediction target patch is the first type halftone patch will be described as an example, but this second spectral characteristic calculation method can also be applied to a case where the prediction target patch is the second type halftone patch. Hereinafter, the halftone patch for which the spectral characteristic data has been obtained for the prediction target color is referred to as a "characteristic acquired patch".

Figure 14:
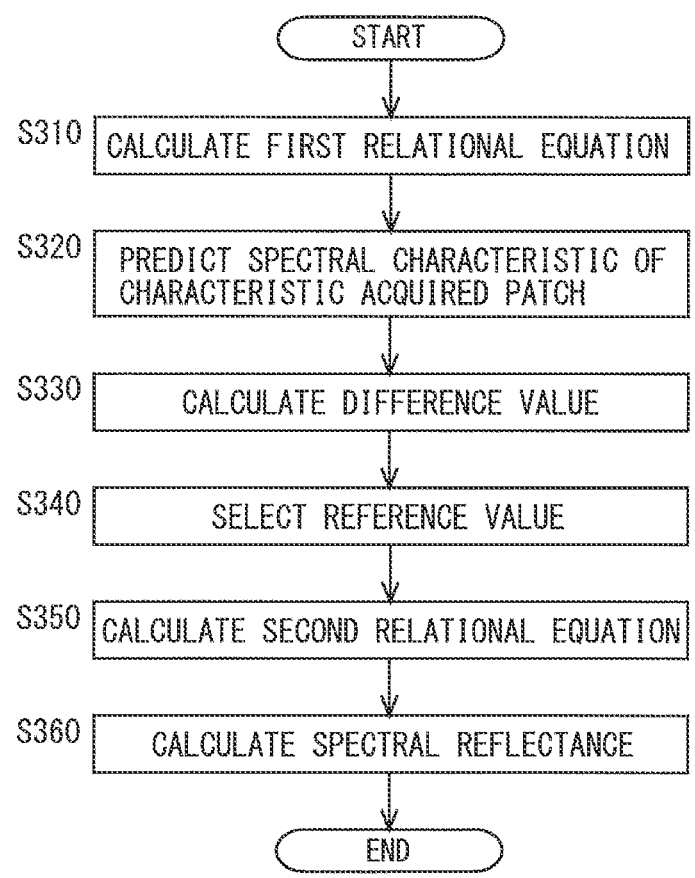
FIG. 14 is a flowchart illustrating a procedure for a spectral characteristic calculation process by a second spectral characteristic calculation method in the embodiment.

FIG. 14 is a flowchart illustrating a procedure for a spectral characteristic calculation process by the second spectral characteristic calculation method. Similarly to the first spectral characteristic calculation method, the spectral characteristic data of the sample color needs to be stored in the spectral characteristic database 142 before the spectral characteristic calculation process is executed. Further, the submitted data DIN needs to include the spectral characteristic data of each of the paper white patch PA1, the solid patch PA2, and at least one first type halftone patch for the prediction target color.

First, for each of the plurality of sample colors, a relational equation representing the relationship between the spectral reflectance of the solid patch PA2 and the spectral reflectance of the characteristic acquired patch (hereinafter referred to as a "first relational equation") is obtained (step S310). Note that the first relational equation is obtained by a procedure similar to the procedure for obtaining the relational equation by the first spectral characteristic calculation method. In step S310, the first relational equation of the number equal to the number of the characteristic acquired patches is obtained for each sample color. When the number of the characteristic acquired patches is two, two first relational equations are obtained for each sample color.

Next, by applying the spectral characteristic data (36 pieces of spectral reflectance data) of the solid patch PA2 for the prediction target color to the first relational equation for each of the plurality of sample colors, the predicted value of the spectral characteristic data (36 pieces of spectral reflectance data) of the characteristic acquired patch for the prediction target color is obtained (step S320). When 32 colors are prepared as sample colors, 32 predicted values (one predicted value includes 36 pieces of spectral reflectance data) are obtained for each characteristic acquired patch in step S320.

Thereafter, for each of the plurality of sample colors, a difference value between the predicted value obtained in step S320 and a measured value (a value obtained from the submitted data) of the spectral characteristic data of the characteristic acquired patch for the prediction target color is obtained (step S330). In the present embodiment, as the difference value, a square error between the predicted value obtained in step S320 and the measured value of the spectral characteristic data of the characteristic acquired patch for the prediction target color is obtained.

Meanwhile, when the number of the characteristic acquired patches is one, only one square error is obtained for each sample color, so that the square error can be adopted as the difference value. In contrast, when the number of the characteristic acquired patches is two or more, a square error is obtained for each characteristic acquired patch for each sample color. Then, for example, a mean value of the square errors is adopted as the difference value. When the number of the characteristic acquired patches is three, three square errors are obtained, and a mean value of the three square errors is adopted as the difference value. Instead of the simple mean value of the square errors, a weighted mean value of the square errors can be adopted as the difference value.

After the completion of step S330, the sample color for which the minimum difference value has been obtained in step S330 among the plurality of sample colors is selected as the reference color (step S340). That is, the sample color that can most accurately predict the spectral characteristic data of the characteristic acquired patch for the prediction target color using the first relational equation among the plurality of sample colors is selected as the reference color.

Next, a second relational equation for obtaining 36 pieces of spectral reflectance data to be the spectral characteristic data of the prediction target patch for the prediction target color is calculated (step S350). Here, it is assumed that one patch having a dot percentage of 50% is a characteristic acquired patch. At the time of obtaining the relational equation in the first spectral characteristic calculation method, normalization is performed to set the spectral reflectance of the paper white patch PA1 to 1. That is, the relational equation in the first spectral characteristic calculation method is obtained using the spectral reflectance of the solid patch PA2 as a first reference and the spectral reflectance of the paper white patch PA1 as a second reference. In contrast, in the second spectral characteristic calculation method, at the time of obtaining the second relational equation, the spectral reflectance of the characteristic acquired patch is included in the reference.

Figure 15:
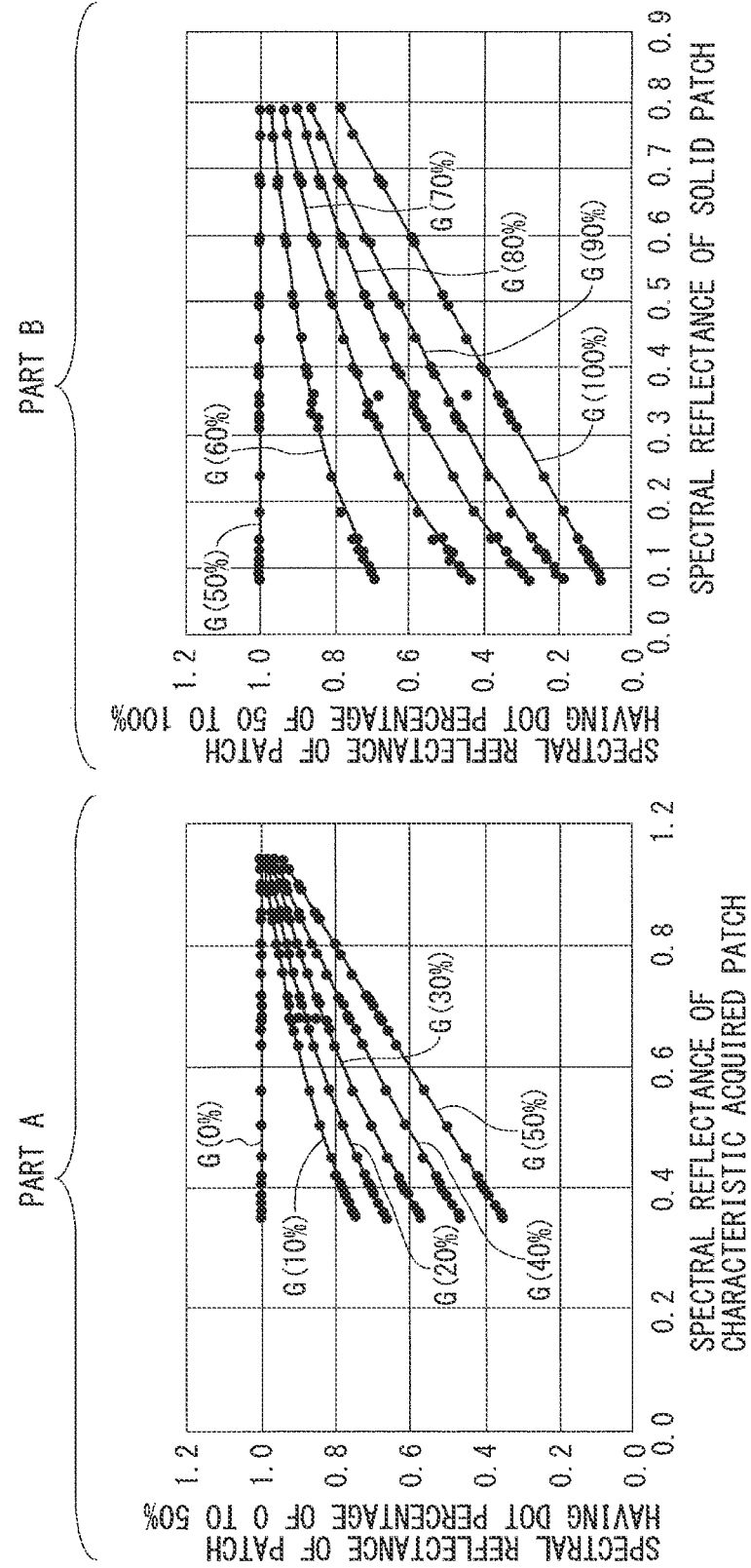
FIG. 15 is a diagram for explaining the second spectral characteristic calculation method in the embodiment.

In this example, the second relational equations corresponding to four prediction target patches with a dot percentage of 60% or more and less than 90% and the second relational equations corresponding to four prediction target patches with a dot percentage of 10% or more and less than 40% have different criteria used in creating the equation. Specifically, each of the second relational equations corresponding to the four prediction target patches with a dot percentage of 10% or more and less than 40% is obtained using the spectral reflectance of the characteristic acquired patch (dot percentage: 50%) as a first reference and the spectral reflectance of the paper white patch PA1 as a second reference (cf. part A in FIG. 15). Each of the second relational equations corresponding to the four prediction target patches with a dot percentage of 60% or more and less than 90 is obtained using the spectral reflectance of the solid patch PA2 as a first reference and the spectral reflectance of the characteristic acquired patch (dot percentage: 50%) as a second reference (cf. part B in FIG. 15). Regarding FIG. 15, a line (curve or straight line) denoted by reference sign G(z) (z is a value in increments of 10 from 0 to 100) represents a second relational equation corresponding to a patch having a dot percentage of z %.

The second relational equation is obtained by the same procedure as the relational equation in the first spectral characteristic calculation method in a state in which the reference is determined as described above. That is, in step S350, for the reference color, a relational equation representing the relationship between the spectral characteristic data of the solid patch PA2, which is a patch having the maximum ink density, and the spectral characteristic data of the insufficient patch having an ink density larger than that of the characteristic acquired patch and a relational equation representing the relationship between the spectral characteristic data of the characteristic acquired patch and the spectral characteristic data of the insufficient patch having an ink density smaller than that of the characteristic acquired patch are obtained as the second relational equations.

Finally, the spectral characteristic data (36 pieces of spectral reflectance data) of the prediction target patch for the prediction target color is obtained using the second relational equation (step S360). In the above example, the spectral characteristic data (36 pieces of spectral reflectance data) of each of the four prediction target patches with a dot percentage of 10% or more and less than 40% is obtained by applying the spectral characteristic data (36 pieces of spectral reflectance data) of the characteristic acquired patch for the prediction target color to corresponding second relational equation, and the spectral characteristic data (36 pieces of spectral reflectance data) of each of the four prediction target patches with a dot percentage of 60% or more and less than 90% is obtained by applying the spectral characteristic data (36 pieces of spectral reflectance data) of the solid patch PA2 for the prediction target color to corresponding second relational equation. In this manner, in step S360, for the prediction target color, the spectral characteristic data of the insufficient patch having an ink density larger than that of the characteristic acquired patch is obtained by applying the spectral characteristic data of the solid patch PA2, which is a patch having the maximum ink density, to the corresponding second relational equation, and the spectral characteristic data of the insufficient patch having an ink density smaller than that of the characteristic acquired patch is obtained by applying the spectral characteristic data of the characteristic acquired patch to the corresponding second relational equation.

Note that a first relational equation calculation step is achieved by step S310, a prediction step is achieved by step S320, a difference value calculation step is achieved by step S330, a reference color selection step is achieved by step S340, a second relational equation calculation step is achieved by step S350, and a spectral characteristic calculation step is achieved by step S360.

5.3 Third Spectral Characteristic Calculation Method

Next, a method for obtaining the spectral characteristic data of the second type patch 52 using the spectral characteristic data of the solid patch PA2 will be described as a third spectral characteristic calculation method.

Figure 16:
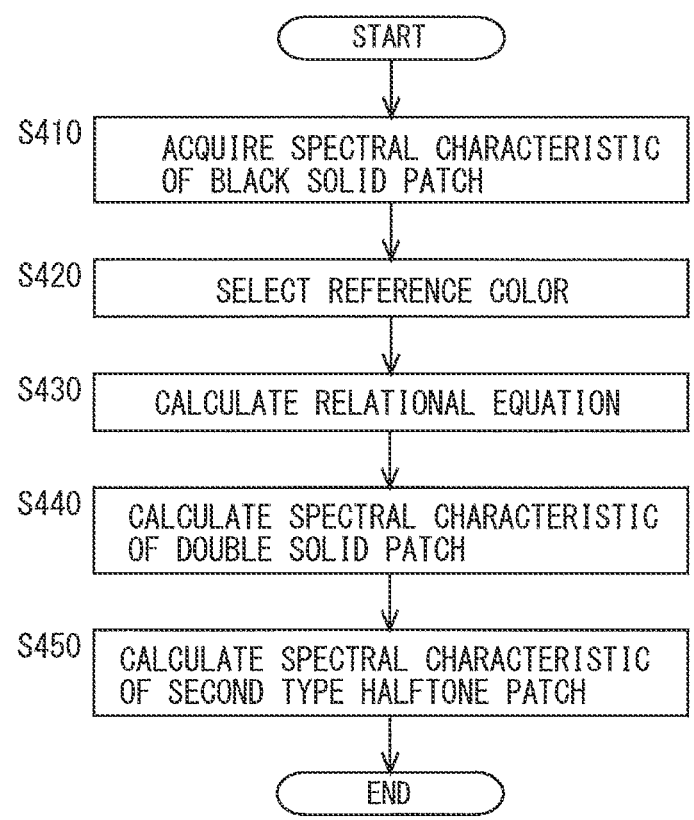
FIG. 16 is a flowchart illustrating a procedure for a spectral characteristic calculation process by a third spectral characteristic calculation method in the embodiment.

FIG. 16 is a flowchart illustrating a procedure for a spectral characteristic calculation process by the third spectral characteristic calculation method. First, the spectral characteristic data of the black solid patch PA3 on the target base material is acquired from the spectral characteristic data of any sample color stored in the spectral characteristic database 142 (step S410).

Next, as in step S210 (cf. FIG. 9) in the first spectral characteristic calculation method, a color close to the prediction target color is selected as a reference color from among the plurality of sample colors (step S420).

Next, for the reference color (the sample color selected in step 420), a relational equation representing the relationship between the spectral reflectance of the solid patch PA2 and the spectral reflectance of the double solid patch PA4 is obtained (step S430). This relational equation is obtained by the same procedure as the relational equation in the first spectral characteristic calculation method.

Next, by applying the spectral characteristic data (36 pieces of spectral reflectance data) of the solid patch PA2 for the prediction target color to the relational equation obtained in step S430, the spectral characteristic data (36 pieces of spectral reflectance data) of the double solid patch PA4 for the prediction target color is obtained (step S440).

Finally, using the spectral characteristic data of the black solid patch PA3 acquired in step S410 and the spectral characteristic data of the double solid patch PA4 obtained in step S440, the spectral characteristic data (36 pieces of spectral reflectance data) of the second type halftone patch for the prediction target color is obtained by a procedure similar to the first spectral characteristic calculation method (step 3450).

5.4 Fourth Spectral Characteristic Calculation Method

Next, a method for obtaining the spectral characteristic data of the second type patch 52 using machine learning will be described as a fourth spectral characteristic calculation method. In this method, a color prediction model for obtaining the spectral characteristic data of the prediction target patch from the spectral characteristic data of the solid patch PA2 is constructed taking the second type patch 52 as the prediction target patch. Then, spectral characteristic data of the prediction target patch for the prediction target color is obtained using the color prediction model.

The color prediction model is achieved by a neural network that performs machine learning. A process related to the color prediction model is roughly divided into a process in a learning stage and a process in a prediction (inference) stage. In the learning stage, teaching data (training data) is provided to the neural network, and machine learning using the teaching data is performed in the neural network. Spectral reflectance data is provided to the neural network as teacher data. Here, one piece of teaching data includes 36 pieces of spectral reflectance data that are the spectral characteristic data of the solid patch PA, and 36 pieces of spectral reflectance data that are the spectral characteristic data of one second type patch 52. In the prediction stage, the spectral characteristic data (36 pieces of spectral reflectance data) of the solid patch PA2 for the prediction target color is provided to the learned neural network. Thereby, the spectral characteristic data (36 pieces of spectral reflectance data) of the prediction target patch for the prediction target color is outputted from the neural network.

Figure 17:
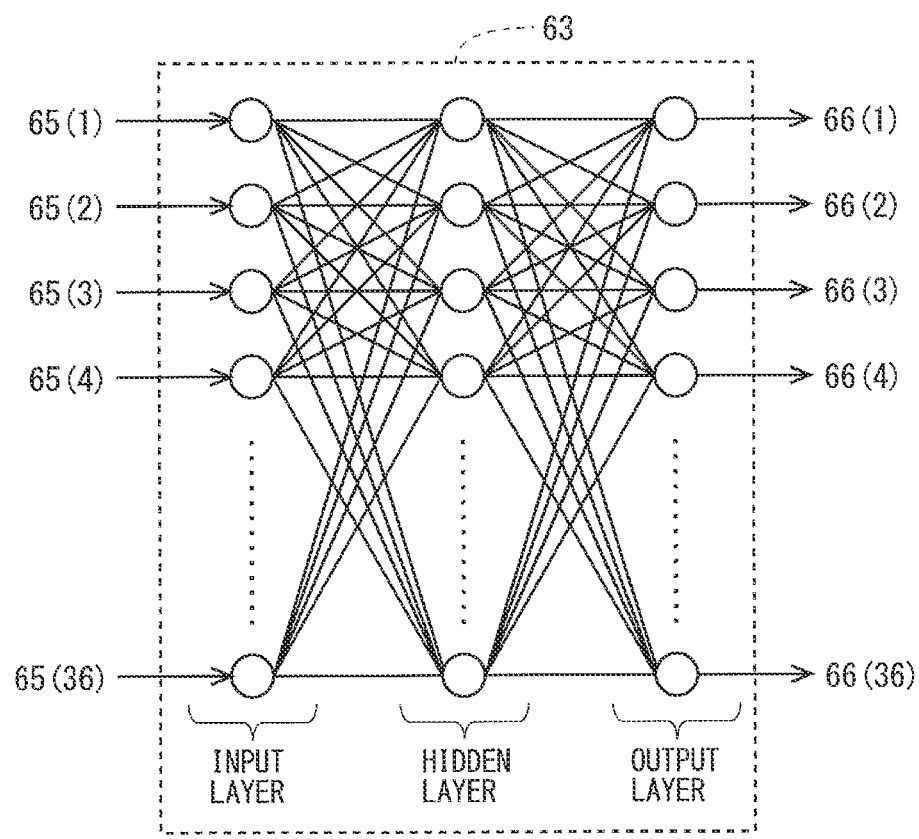
FIG. 17 is a diagram illustrating an example of a structure of a neural network used in a spectral characteristic calculation process by a fourth spectral characteristic calculation method in the embodiment.

FIG. 17 is a diagram illustrating an example of a structure of the neural network 63 used in the present embodiment. The neural network 63 includes an input layer, a hidden layer (intermediate layer), and an output layer. The input layer is composed of 36 units (neurons) that receive 36 pieces of spectral reflectances 65(1) to 65(36). The hidden layer is also composed of 36 units. However, the number of units in the hidden layer is not limited to 36. In the example shown in FIG. 17, the number of layers of hidden layers is 1, but the number of layers of hidden layers may be 2 or more. The output layer is composed of 36 units that output 36 pieces of spectral reflectances 66(1) to 66(36).

The input layer and the hidden layer are fully connected, and the hidden layer and the output layer are also fully connected. A sigmoid function is adopted as the activation function of the hidden layer and the output layer. However, a function other than the sigmoid function may be adopted as the activation function.

Figure 18:
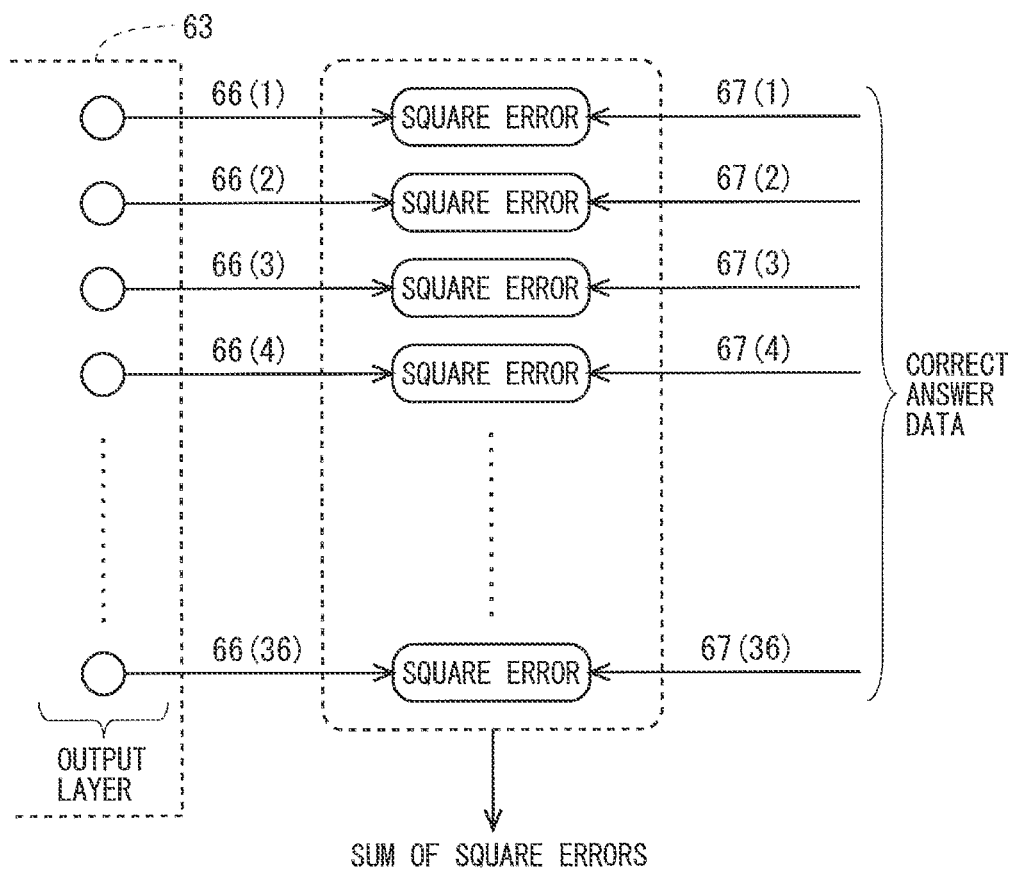
FIG. 18 is a diagram for explaining a process at the time of learning using the neural network in the embodiment.

During learning using this neural network 73, the spectral reflectances 65(1) to 65(36) are given to the input layer. As a result, forward propagation is performed in the neural network 63, and the sum of square errors of the spectral reflectances 66(1) to 66(36) outputted from the output layer and the spectral reflectances 67(1) to 67(36) which are correct answer data is obtained (see FIG. 18). Then, the parameters (weighting coefficient and bias) of the neural network 63 are updated by using the gradient descent method based on the result obtained by the back propagation of the errors. The above parameters are optimized by repeating the learning as described above. As a learning method, batch learning may be used in which all pieces of teaching data are given to the neural network 63 in a collective manner, mini-batch learning may be used in which teaching data is divided into a plurality of groups, and the teaching data is given to the neural network 63 for each group, or online learning may be used in which teaching data is given to the neural network 63 one by one.

During prediction (inference) using this neural network 63, the spectral reflectances 65(1) to 65(36) of the solid patch PA2 for the prediction target color are given to the input layer. Then, the forward propagation process is performed in the neural network 63, and the spectral reflectances 66(1) to 66(36) are outputted from the output layer. These 36 pieces of spectral reflectances 66(1) to 66(36) are treated as the spectral characteristic data of the prediction target patch for the prediction target color.

Meanwhile, the neural network 63 shown in FIG. 17 is prepared for each prediction target patch. In a case in which the spectral characteristic data of each of all the second type patches 52 is obtained by this method, 11 neural networks 63 are prepared. Then, learning and prediction (inference) are performed for each prediction target patch using the corresponding neural network 63.

In a case where this method is adopted, the color prediction model described above needs to be constructed before operation is commenced. During the operation, the spectral characteristic data (36 pieces of spectral reflectance data) of the solid patch PA2 for the prediction target color is provided to the neural network 63 that achieves the color prediction model. Thereby, the spectral characteristic data (36 pieces of spectral reflectance data) of the prediction target patch for the prediction target color is obtained.

5.5 Fifth Spectral Characteristic Calculation Method

Next, a method using spline interpolation will be described as a fifth spectral characteristic calculation method. This fifth spectral characteristic calculation method is a method applicable to a case where the prediction target patch is the first type patch 51, and the submitted data needs to include the spectral characteristic data of each of the paper white patch PA1, the solid patch PA2, and at least one first type halftone patch for the prediction target color.

In this method, spline interpolation (e.g., cubic spline interpolation) based on the spectral characteristic data (36 pieces of spectral reflectance data) of each of the paper white patch PA1, the solid patch PA2, and one first type halftone patch for the prediction target color is performed. Thereby, the spectral characteristic data (36 pieces of spectral reflectance data) of the prediction target patch (first type halftone patch) for the prediction target color is obtained. Thus, even when the spectral characteristic data for various colors is not held, it is possible to supplement the spectral characteristic data of the prediction target patch for the prediction target color with relatively high accuracy without requiring the user's operation.

Note that spline interpolation can also be performed on the basis of spectral characteristic data of each of three patches except for the combination the "paper white patch PA1, solid patch PA2, and one first type halftone patch". That is, concerning any three patches for each of which the spectral characteristic data has been obtained for the prediction target color, when a patch having the highest ink density is defined as a "first patch", a patch having the lowest ink density is defined as a "third patch", and a patch having an ink density lower than the first patch and higher than the third patch is defined as a "second patch", the spectral characteristic data of the patch (insufficient patch) corresponding to the ink density between the ink density of the first patch and the ink density of the third patch can be obtained by performing spline interpolation using the spectral characteristic data of the first patch, the spectral characteristic data of the second patch, and the spectral characteristic data of the third patch.

5.6 Sixth Spectral Characteristic Calculation Method

Next, a method using linear interpolation will be described as a sixth spectral characteristic calculation method. This sixth spectral characteristic calculation method is a method applicable to a case where the prediction target patch is the first type patch 51, and the submitted data needs to include the spectral characteristic data of each of the paper white patch PA1 and the solid patch PA2 for the prediction target color. Note that, when this method is adopted, a color obtained by overprinting inks of a plurality of colors including a spot color may not be reproduced with sufficient accuracy by the digital printing device 200.

In this method, linear interpolation based on the spectral characteristic data (36 pieces of spectral reflectance data) of each of the paper white patch PA1 and the solid patch PA2 for the prediction target color is performed. Thereby, the spectral characteristic data (36 pieces of spectral reflectance data) of the prediction target patch (first type halftone patch) for the prediction target color is obtained. Similarly to the fifth spectral characteristic calculation method, even when the spectral characteristic data for various colors is not held, it is possible to supplement the spectral characteristic data of the prediction target patch for the prediction target color without requiring the user's operation.

6. Supplement of Spectral Characteristic Data

Next, the step of supplementing the spectral characteristic data (step S45 in FIG. 5) will be described in detail. In this step, first, in order to determine a method for supplementing the spectral characteristic data for each spot color, the detection situation and the like of the insufficient patch for each spot color are classified. Then, the spectral characteristic data is supplemented by a method depending on the classification result for each spot color.

Figure 19:
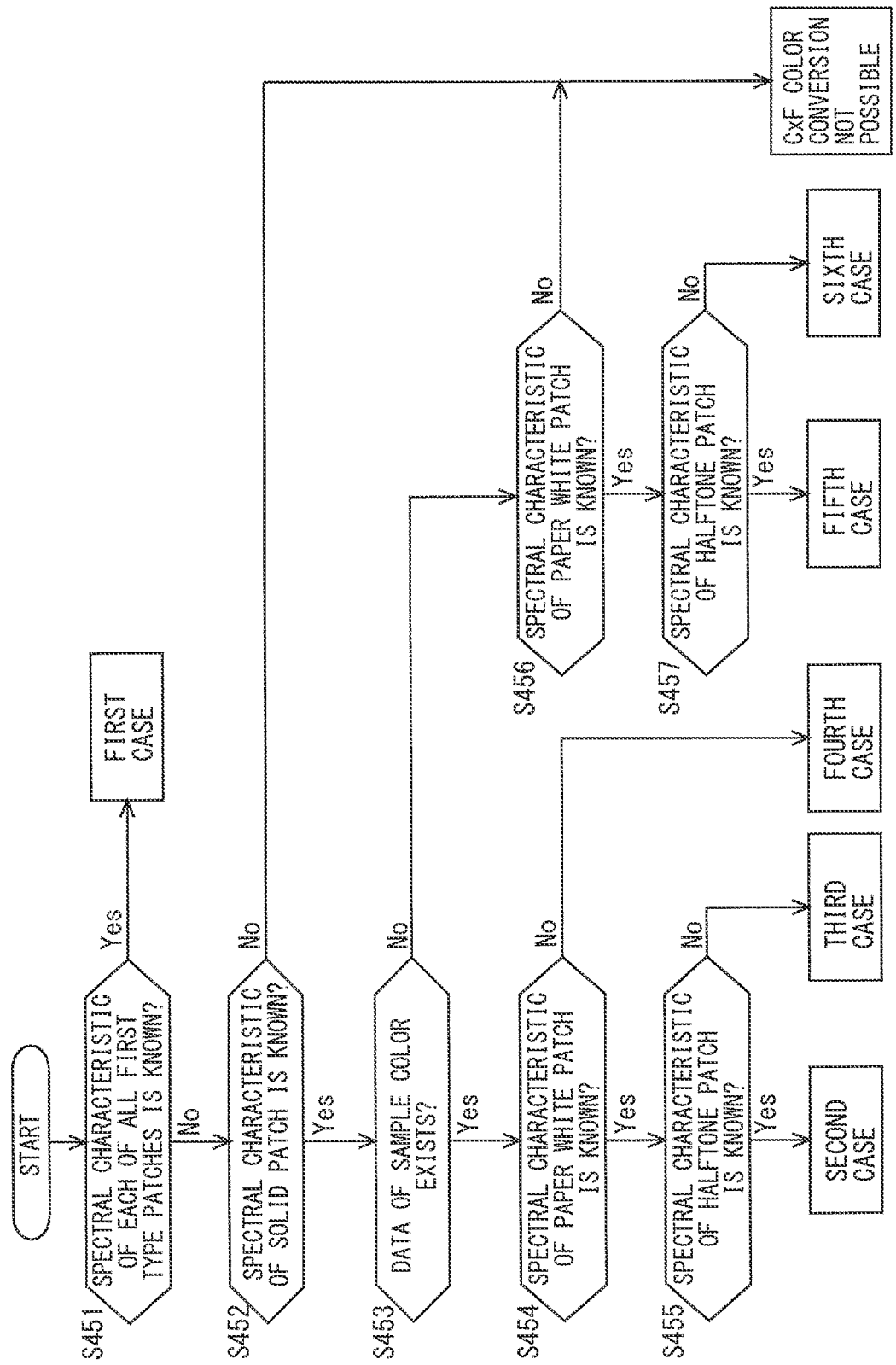
FIG. 19 is a flowchart illustrating a procedure for classifying a detection situation and the like of an insufficient patch for each spot color in the embodiment.

6.1 Classification Based on Detection Situation and the Like of Insufficient Patch In the present embodiment, in order to determine the method for supplementing the spectral characteristic data for each spot color, the detection situation and the like of the insufficient patch for each spot color are classified into six cases (first to sixth cases). A classification procedure will be described below with reference to the flowchart illustrated in FIG. 19. Note that a situation currently focused on as the detection situation and the like of the insufficient patch is referred to as a "focused situation" for convenience.

First, it is determined whether or not spectral characteristic data of each of all the first type patches 51 has been obtained (step S451). As a result, when the spectral characteristic data of each of all the first type patches 51 has been obtained, the focused situation is classified into the first case, and otherwise, the process proceeds to step S452.

In step S452, it is determined whether or not the spectral characteristic data of the solid patch PA2 has been obtained. As a result, when the spectral characteristic data of the solid patch PA2 has been obtained, the process proceeds to step S453, and otherwise, it is determined that the C×F color conversion process cannot be executed for the color data including the corresponding spot color.

In step S453, it is determined whether or not the spectral characteristic data of the sample color exists in the spectral characteristic database 142. As a result, when the spectral characteristic data of the sample color exists, the process proceeds to step S454, and otherwise, the process proceeds to step S456. Note that the configuration may be such that the process may proceed to step S456 in a case where a sample color having the characteristic similar to the color to be processed does not exist even when the spectral characteristic data of the sample color exists in the spectral characteristic database 142.

In step S454, it is determined whether or not the spectral characteristic data of the paper white patch PA1 has been obtained. As a result, when the spectral characteristic data of the paper white patch PA1 has been obtained, the process proceeds to step S455, and otherwise, the focused situation is classified into the fourth case.

In step S455, it is determined whether or not the spectral characteristic data of at least one first type halftone patch has been obtained. As a result, when the spectral characteristic data of at least one first type halftone patch has been obtained, the focused situation is classified into the second case, and otherwise, the focused situation is classified into the third case.

In step S456, it is determined whether or not the spectral characteristic data of the paper white patch PA1 has been obtained. As a result, when the spectral characteristic data of the paper white patch PA1 has been obtained, the process proceeds to step S457, and otherwise, it is determined that the CxF color conversion process cannot be executed for the color data including the corresponding spot color.

In step S457, it is determined whether or not the spectral characteristic data of at least one first type halftone patch has been obtained. As a result, when the spectral characteristic data of at least one first type halftone patch has been obtained, the focused situation is classified into the fifth case, and otherwise, the focused situation is classified into the sixth case.

6.2 Method for Supplementing Spectral Characteristic Data for Each Case

Next, a method for supplementing spectral characteristic data for each of the first to sixth cases described above will be described.

6.2.1 First Case

In the first case, spectral characteristic data for the second type patch 52 is obtained by the third spectral characteristic calculation method or the fourth spectral characteristic calculation method.

6.2.2 Second Case

In the second case, spectral characteristic data for the first type halftone patch except for the characteristic acquired patch is obtained by the second spectral characteristic calculation method. Further, spectral characteristic data for the second type patch 52 is obtained by the third spectral characteristic calculation method or the fourth spectral characteristic calculation method.

6.2.3 Third Case

In the third case, spectral characteristic data for the first type halftone patch is obtained by the first spectral characteristic calculation method. Further, spectral characteristic data for the second type patch 52 is obtained by the third spectral characteristic calculation method or the fourth spectral characteristic calculation method.

6.2.4 Fourth Case

In the fourth case, first, spectral characteristic data of the same base material as the base material used for printing (i.e., the spectral characteristic data of the paper white patch PA1) is acquired from the spectral characteristic database 142. Then, spectral characteristic data for the first type halftone patch is obtained by the first spectral characteristic calculation method. Further, spectral characteristic data for the second type patch 52 is obtained by the third spectral characteristic calculation method or the fourth spectral characteristic calculation method. Note that, in a case where the spectral characteristic data of the same base material as the base material used for printing does not exist in the spectral characteristic database 142, the spectral characteristic data of the base material having a characteristic similar to that of the base material used for printing may be acquired from the spectral characteristic database 142 although the accuracy decreases.

In the present embodiment, a minimum density patch data acquisition step is achieved by the operation of acquiring the spectral characteristic data of the paper white patch PA1 from the spectral characteristic database 142 as described above.

6.2.5 Fifth Case

In the fifth case, spectral characteristic data for the first type halftone patch except for the characteristic acquired patch is obtained by the fifth spectral characteristic calculation method. Further, spectral characteristic data for the second type patch 52 is obtained by the fourth spectral characteristic calculation method. Note that, in a case where the fourth spectral characteristic calculation method cannot be adopted, data of a dummy value can also be used as spectral characteristic data for the second type patch 52 although sufficient color prediction accuracy cannot be obtained.

6.2.6 Sixth Case

In the sixth case, spectral characteristic data for the first type halftone patch is obtained by the sixth spectral characteristic calculation method. Further, spectral characteristic data for the second type patch 52 is obtained by the fourth spectral characteristic calculation method. Note that, in a case where the fourth spectral characteristic calculation method cannot be adopted, data of a dummy value can also be used as spectral characteristic data for the second type patch 52 although sufficient color prediction accuracy cannot be obtained.

7. Color Conversion Process

The matters related to the present invention in the color conversion process of step S60 of FIG. 5 will be described.

7.1 Process Classification of CxF Color Conversion Process and ICC Color Conversion Process As described above, the color conversion process includes the CxF color conversion process and the ICC color conversion process. Therefore, a description will be given of which one of the CxF color conversion process and the ICC color conversion process is performed on data of pixels constituting image data included in the submitted data DIN.

As for data of pixels made up only of color value data of process colors, the ICC color conversion process is performed regardless of whether or not the CxF data for all the process colors to be used and the complete printing order data have been obtained.

As for data of pixels made up of color value data of process colors and color value data of spot colors, when the CxF data for all the process colors and spot colors to be used and the complete printing order data are obtained, the CxF color conversion process is performed, and otherwise, the ICC color conversion process is performed.

As for data of pixels made up only of color value data of spot colors, when the CxF data for all the spot colors to be used and the complete printing order data are obtained, the CxF color conversion process is performed, and otherwise, the ICC color conversion process is performed.

7.2 CxF Color Conversion Process

Figure 20:
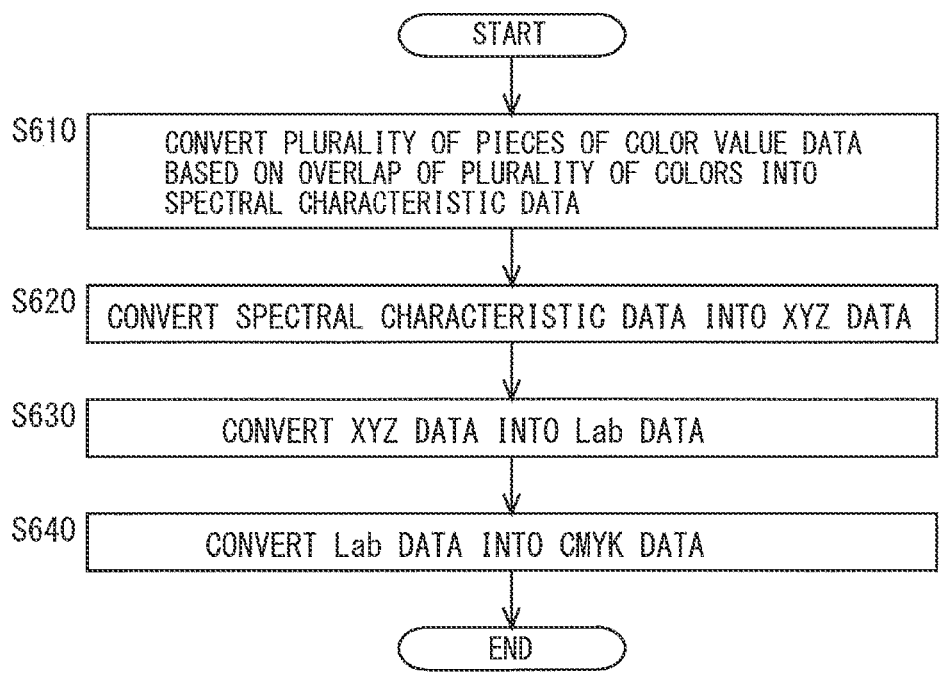
FIG. 20 is a flowchart illustrating a schematic procedure for a C×F color conversion process in the embodiment.

The procedure for the CxF color conversion process included in the color conversion process of step S60 of FIG. 5 will be described with reference to the flowchart illustrated in FIG. 20. Here, attention is paid to one combination (hereinafter referred to as a "focused color value group") of color values of a plurality of colors including at least one spot color.

After the start of the CxF color conversion process, first, data of the focused color value group (a plurality of pieces of color value data based on the overlap of a plurality of colors) is converted into spectral characteristic data (36 pieces of spectral reflectance data) using the CxF data and the printing order data (step S610). In this regard, when the missing data was detected in the process of step S30 of FIG. 5, the process of step S610 is performed in a state in which the missing data is supplemented with the supplementary data DH. Note that, regarding a specific method for converting the data of the focused color value group into the spectral characteristic data, for example, a known method as disclosed in Japanese Laid-Open Patent Publication No. 2020-017902 can be adopted.

Next, the spectral characteristic data is converted into XYZ data (data of tristimulus values X, Y, and Z) (step S620). The tristimulus values X, Y, and Z are obtained by a known method from a spectral distribution of a light source, spectral reflectance, and a color-matching function associated with each of the tristimulus values X, Y, and Z. More specifically, the tristimulus values X, Y, and Z are calculated by the following equation (2).

$$\left. \begin{array}{l} X = Km \sum S(\lambda) \cdot R(\lambda) \cdot x(\lambda) \\ Y = Km \sum S(\lambda) \cdot R(\lambda) \cdot y(\lambda) \\ Z = Km \sum S(\lambda) \cdot R(\lambda) \cdot z(\lambda) \end{array} \right\} \quad (2)$$

where Km represents the maximum luminous efficiency, $\Sigma$ is the sum of values for every 10 nm for $\lambda$ (wavelength) (here, values for every 10 nm in the wavelength range of 380-730 nm), $S(\lambda)$ represents the spectral distribution of the light source, $R(\lambda)$ represents the spectral reflectance, and $x(\lambda)$, $y(\lambda)$, and $z(\lambda)$ are color-matching functions associated with the tristimulus values X, Y, and Z, respectively.

Next, the XYZ data (the data of the tristimulus values X, Y, and Z) is converted into Lab data (data in the CIELAB color space) by a known method (step S630).

Finally, the XYZ data is converted into CMYK data (data representing color values of process colors) using an ICC profile for output to the digital printing device 200 (step S640).

In the present embodiment, a first conversion step is achieved by step S610, and a second conversion step is achieved by step S620, step S630, and step S640.

8. Effects

According to the present embodiment, after the PDF file 60 including the image data is provided to the print data generation device 100 as submitted data, the print data generation device 100 analyzes the PDF file 60 to identify data that is missing among data necessary for executing the CxF color conversion process (that is, the print data generation device 100 analyzes the PDF file 60 to identify missing data among essential data). Then, when the printing order data is insufficient, the printing order data is supplemented without the user's operation, and when the spectral characteristic data of the patch constituting the CxF chart is insufficient, the spectral characteristic data is supplemented without the user's operation. As above, according to the present embodiment, regarding the CxF color conversion process, the determination of the presence or absence of the essential data and the supplement of the missing data are automatically performed without requiring the user's operation. Thus, the printing process of the image data including the spot color by the digital printing device 200 is made efficient. Further, digital printing of image data including a spot color can be executed so as to obtain a printed matter with high accuracy even when a user has poor knowledge of analog printing.

9 Modifications

Modifications of the above embodiment will be described below.

9.1 First Modification

Although it has been assumed that essential data (data required for executing the CxF color conversion process) is provided to the print data generation device 100 as data in the PDF file in the above embodiment, the present invention is not limited thereto. As in the present modification, it is also possible to adopt a configuration in which essential data is provided to the print data generation device 100 in the form of a file or the like different from a PDF file.

First, a description will be given of a case where the printing order data is provided to the print data generation device 100 in a file (hereinafter referred to as a "first external file" for convenience) different from the PDF file. In this case, the following process is performed in step S30 of FIG. 5. A process of identifying the insufficient patch described above for the spot color used in the image data is performed by analyzing the PDF file. In addition, a process of checking whether or not complete printing order data described according to a predetermined rule is included in an external file is performed by analyzing the external file. In other words, the print data generation device 100 as a computer analyzes the first external file to determine whether or not the complete printing order data is included in the submitted data.

Next, a description will be given of a case where the CxF data is provided to the print data generation device 100 as a file (hereinafter referred to as a "second external file" for convenience) different from a PDF file. It is assumed that complete printing order data is included in the PDF file. In this case, the following process is performed in step S30 of FIG. 5. A process of identifying the insufficient patch described above for the spot color used in the image data is performed by analyzing the second external file. Further, the PDF file is analyzed to determine whether or not the complete printing order data is included in the submitted data.

Note that it is also possible to adopt a configuration in which both the printing order data and the C×F data are provided to the print data generation device 100 as a file different from the PDF file.

9.2 Second Modification

Although the spectral characteristic data of the insufficient patch is supplemented using any one of the first to sixth spectral characteristic calculation methods in the above embodiment, the present invention is not limited thereto. When the spectral characteristic data of the insufficient patch is held in the spectral characteristic database 142, the spectral characteristic data of the insufficient patch may supplemented from the spectral characteristic database 142.

In the present modification, concerning a procedure for classifying the detection situation and the like of the insufficient patch for each spot color in order to determine a method for supplementing the spectral characteristic data, step S450 is provided before step S451 as illustrated in FIG. 21. In step S450, when the spectral characteristic data available is included in the spectral characteristic database 142, the spectral characteristic data is acquired.

9.3 Third Modification

Although the spectral reflectance data is used as the spectral value data constituting the spectral characteristic data in the above embodiment, the present invention is not limited thereto. As the spectral value data constituting the spectral characteristic data, for example, data of spectral absorptivity (a value obtained by subtracting the spectral reflectance from 1) or data of a spectral absorption coefficient can also be used.

9.4 Fourth Modification

In the above embodiment, whether or not the complete printing order data is included in the submitted data DIN is checked, and when the complete printing order data is not included in the submitted data DIN, the process of supplementing the printing order data is performed. However, the present invention is not limited thereto. For example, in a case where an operation of always including the complete printing order data in the submitted data DIN is adopted, a process of checking whether the complete printing order data is included in the submitted data DIN and a process of supplementing the printing order data are unnecessary. That is, the printing order data checking unit 422 and the printing order supplement unit 432 among the components illustrated in FIG. 4 are unnecessary, and step S50 and step S55 among the steps illustrated in FIG. 5 are unnecessary.

10. Others

Although the present invention has been described in detail above, the above description is illustrative in all aspects and is not restrictive. It is understood that numerous other modifications and variations can be devised without departing from the scope of the present invention. For example, although a PDF file (PDF data) is provided to the print data generation device 100 as submitted data in the above embodiment, the present invention can also be applied to a case where a configuration has been adopted in which data in a format except for PDF is provided to the print data generation device 100 as submitted data.

This application is an application claiming priority based on Japanese Patent Application No. 2021-200526 entitled "Color Data Conversion Method, Color Data Conversion Device, and Color Data Conversion Program" filed on Dec. 10, 2021, and the contents of which are herein incorporated by reference.

What is claimed is:

1. A color data conversion method for converting, using a computer, color data related to a spot color included in submitted data into color data for a printing device used for printing on a basis of color chart data including spectral characteristic data of each of a plurality of patches corresponding to a plurality of levels of ink density, the color data conversion method comprising:
   a submission step of providing image data to be printed including color data and spectral characteristic data related to a spot color used in the image data to the computer as the submitted data;
   an insufficient patch identification step of identifying, by the computer, a patch, spectral characteristic data of which is not obtained for a spot color used in the image data, as an insufficient patch by analyzing the submitted data;
   a spectral characteristic supplement step of supplementing, by the computer, spectral characteristic data of the insufficient patch;
   a first conversion step of converting, by the computer, color data related to a spot color and included in the image data into spectral characteristic data on a basis of the color chart data including spectral characteristic data supplemented in the spectral characteristic supplement step; and
   a second conversion step of converting, by the computer, the spectral characteristic data obtained in the first conversion step into color data for the printing device.

2. The color data conversion method according to claim 1, further comprising:
   a printing order data checking step of determining, by the computer, whether printing order data indicating a printing order of a plurality of ink colors at a time of analog printing based on the image data is included in the submitted data; and
   a printing order supplement step of supplementing, by the computer, the printing order data when it is determined that the printing order data is not included in the submitted data in the printing order data checking step,
   wherein in the first conversion step, the computer converts color data included in the image data into spectral characteristic data in consideration of the printing order data supplemented in the printing order supplement step.

3. The color data conversion method according to claim 2, wherein
   the printing order supplement step includes
       a lightness classification step of classifying, by the computer, a plurality of ink colors used for the analog printing into a plurality of lightness levels by lightness, and
       a saturation classification step of classifying, by the computer, two or more ink colors into a plurality of saturation levels by saturation when the two or more ink colors are classified into the same lightness level in the lightness classification step, and
   in the printing order supplement step, the computer supplements the printing order data so that an ink color classified into a lightness level corresponding to higher lightness comes first in the printing order than an ink color classified into a lightness level corresponding to lower lightness, and for two or more ink colors classified into the same lightness level, an ink color classified into a saturation level corresponding to higher saturation comes first in the printing order than an ink color classified into a saturation level corresponding to lower saturation.

4. The color data conversion method according to claim 3, wherein when two or more ink colors are classified into the same saturation level in the saturation classification step, the computer supplements the printing order data so that the printing order of the two or more ink colors is an order following a predetermined rule on a basis of hue.

5. The color data conversion method according to claim 2, wherein
in the submission step, the printing order data is provided to the computer as a first external file different from a file constituting the image data, and
in the printing order data checking step, the computer analyzes the first external file to determine whether the printing order data is included in the submitted data.

6. The color data conversion method according to claim 1, wherein
in the submission step, spectral characteristic data for a spot color used in the image data is provided to the computer as a second external file different from a file constituting the image data, and
in the insufficient patch identification step, the computer analyzes the second external file to identify the insufficient patch.

7. The color data conversion method according to claim 1, wherein in the spectral characteristic supplement step, spectral characteristic data of the insufficient patch is acquired from a spectral characteristic database that holds spectral characteristic data of each of the plurality of patches for a plurality of spot colors.

8. The color data conversion method according to claim 1, wherein the spectral characteristic supplement step includes
a reference color selection step of selecting a color, as a reference color, close to a prediction target color from among a plurality of sample colors for which spectral characteristic data of each of the plurality of patches is obtained, the prediction target color being a spot color for which the insufficient patch is identified,
a relational equation calculation step of obtaining, for the reference color, a relational equation representing a relationship between spectral characteristic data of a reference patch and spectral characteristic data of the insufficient patch, the reference patch being a patch having the maximum ink density among the plurality of patches, and
a spectral characteristic calculation step of obtaining spectral characteristic data of the insufficient patch for the prediction target color by applying the spectral characteristic data of the reference patch for the prediction target color to the relational equation.

9. The color data conversion method according to claim 8, wherein the spectral characteristic supplement step further includes a minimum density patch data acquisition step of acquiring spectral characteristic data of a patch having the minimum ink density for the prediction target color from a spectral characteristic database that holds spectral characteristic data of each of the plurality of patches for a plurality of spot colors.

10. The color data conversion method according to claim 1, wherein
the spectral characteristic supplement step includes
a first relational equation calculation step of obtaining a first relational equation representing a relationship between spectral characteristic data of a patch having the maximum ink density and spectral characteristic data of a characteristic acquired patch for each of a plurality of sample colors for which spectral characteristic data of each of the plurality of patches is obtained, the characteristic acquired patch being a patch for which spectral characteristic data is obtained for a prediction target color, the prediction target color being a spot color for which the insufficient patch is identified,
a prediction step of obtaining, for each of the plurality of sample colors, a predicted value of spectral characteristic data of the characteristic acquired patch for the prediction target color by applying spectral characteristic data of a patch having the maximum ink density for the prediction target color to a corresponding first relational equation,
a difference value calculation step of obtaining, for each of the plurality of sample colors, a difference value between the predicted value obtained in the prediction step and a value of spectral characteristic data of the characteristic acquired patch for the prediction target color,
a reference color selection step of selecting, as a reference color, a sample color for which the minimum difference value is obtained in the difference value calculation step among the plurality of sample colors,
a second relational equation calculation step of obtaining, as a second relational equation, a relational equation representing a relationship between spectral characteristic data of a patch having the maximum ink density and spectral characteristic data of an insufficient patch having an ink density larger than an ink density of the characteristic acquired patch and a relational equation representing a relationship between spectral characteristic data of the characteristic acquired patch and spectral characteristic data of an insufficient patch having an ink density smaller than the ink density of the characteristic acquired patch, for the reference color, and
a spectral characteristic calculation step of obtaining spectral characteristic data of an insufficient patch having an ink density larger than the ink density of the characteristic acquired patch for the prediction target color by applying spectral characteristic data of a patch having the maximum ink density to a corresponding second relational equation, and obtaining spectral characteristic data of an insufficient patch having an ink density smaller than the ink density of the characteristic acquired patch by applying spectral characteristic data of the characteristic acquired patch to the corresponding second relational equation.

11. The color data conversion method according to claim 1, wherein in the spectral characteristic supplement step, by spline interpolation using spectral characteristic data of a first patch having the highest ink density among three patches for each of which spectral characteristic data is obtained for a prediction target color, spectral characteristic data of a third patch having the lowest ink density among the three patches, and spectral characteristic data of a second patch having an ink density lower than an ink density of the first patch and higher than an ink density of the third patch, spectral characteristic data of an insufficient patch corresponding to an ink density between the ink density of the first patch and the ink density of the third patch is obtained, the prediction target color being a spot color for which the insufficient patch is identified.

12. The color data conversion method according to claim 1, wherein in the spectral characteristic supplement step, by linear interpolation using spectral characteristic data of a patch having the maximum ink density for a prediction target color and spectral characteristic data of a patch having the minimum ink density for the prediction target color, spectral characteristic data of the insufficient patch for the prediction target color is obtained.

13. The color data conversion method according to claim 1, wherein
the plurality of patches include 11 first type patches obtained by applying a spot color ink on a base material at 11 levels of ink density from the minimum density to the maximum density, and 11 second type patches obtained by applying a spot color ink on black at 11 levels of ink density from the minimum density to the maximum density, and
in the spectral characteristic supplement step, spectral characteristic data of a prediction target patch for a prediction target color is obtained by providing, as input data, spectral characteristic data of a reference patch for the prediction target color to a learned neural network that takes spectral characteristic data of the reference patch as input data and takes spectral characteristic data of the prediction target patch as output data, the prediction target color being a spot color for which the insufficient patch is identified, the prediction target patch being a patch identified as the insufficient patch among the 11 second type patches, the reference patch being a patch having the maximum ink density among the 11 first type patches.

14. A color data conversion device that converts color data related to a spot color included in submitted data into color data for a printing device used for printing on a basis of color chart data including spectral characteristic data of each of a plurality of patches corresponding to a plurality of levels of ink density, the color data conversion device comprising:
a processor; and
a memory configured to store a program,
wherein when the program stored in the memory is executed by the processor, the program causes the processor to:
receive image data to be printed including color data and spectral characteristic data related to a spot color used in the image data as the submitted data;
identify a patch, spectral characteristic data of which is not obtained for a spot color used in the image data, as an insufficient patch, by analyzing the submitted data;
supplement spectral characteristic data of the insufficient patch;
convert color data related to a spot color and included in the image data into spectral characteristic data on a basis of the color chart data including supplemented spectral characteristic data; and
convert spectral characteristic data obtained by conversion into color data for the printing device.

15. A non-transitory computer-readable recording medium recording a color data conversion program for converting color data related to a spot color included in submitted data into color data for a printing device used for printing on a basis of color chart data including spectral characteristic data of each of a plurality of patches corresponding to a plurality of levels of ink density, wherein
the color data conversion program causes a computer to execute
an insufficient patch identification step of identifying a patch, spectral characteristic data of which is not obtained for a spot color used in image data to be printed including color data, as an insufficient patch by analyzing the submitted data including the image data and spectral characteristic data related to a spot color used in the image data,
a spectral characteristic supplement step of supplementing spectral characteristic data of the insufficient patch,
a first conversion step of converting color data related to a spot color and included in the image data into spectral characteristic data on a basis of the color chart data including spectral characteristic data supplemented in the spectral characteristic supplement step, and
a second conversion step of converting spectral characteristic data obtained in the first conversion step into color data for the printing device.

* * * * *